(12) United States Patent
Sugiyama

(10) Patent No.: US 12,602,894 B2
(45) Date of Patent: Apr. 14, 2026

(54) INFORMATION PROCESSING APPARATUS, INFORMATION PROCESSING METHOD, AND STORAGE MEDIUM FOR DETECTING AN OBJECT AS A DETECTION TARGET FROM AN IMAGE

(71) Applicant: CANON KABUSHIKI KAISHA, Tokyo (JP)

(72) Inventor: Kazumichi Sugiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 18/336,871

(22) Filed: Jun. 16, 2023

(65) Prior Publication Data

US 2023/0419633 A1      Dec. 28, 2023

(30) Foreign Application Priority Data

Jun. 22, 2022    (JP) ................................. 2022-100387

(51) Int. Cl.
   *G06V 10/22* (2022.01)
   *G06T 7/11* (2017.01)
   *G06V 10/26* (2022.01)
(52) U.S. Cl.
   CPC ................ *G06V 10/22* (2022.01); *G06T 7/11* (2017.01); *G06V 10/26* (2022.01)

(58) Field of Classification Search
   CPC ........... G06V 10/22; G06V 10/26; G06T 7/11
   See application file for complete search history.

(56) References Cited

U.S. PATENT DOCUMENTS

| | | | | |
|---|---|---|---|---|
| 2012/0294487 | A1* | 11/2012 | Nishimura ................ | G06T 1/20 |
| | | | | 382/173 |
| 2015/0215546 | A1 | 7/2015 | Adachi | |
| 2021/0182589 | A1* | 6/2021 | Kim ........................ | G06V 10/50 |
| 2021/0306556 | A1* | 9/2021 | Kato ........................ | H04N 25/40 |
| 2022/0180529 | A1 | 6/2022 | Muta | |

FOREIGN PATENT DOCUMENTS

| | | |
|---|---|---|
| JP | 2018022340 A | 2/2018 |
| JP | 2020149565 A | 9/2020 |

* cited by examiner

*Primary Examiner* — Casey L Kretzer
(74) *Attorney, Agent, or Firm* — Canon U.S.A., Inc. IP Division

(57) ABSTRACT

An information processing apparatus is configured to acquire detection target sizes at individual positions in an image, set a plurality of detection regions for the image, and detect a detection target in each detection region from the image acquired. At the time of setting the detection regions, based on the detection target sizes at the individual positions, sizes of the detection regions at the individual positions in the image and overlapping ranges between adjacent detection regions are set.

19 Claims, 26 Drawing Sheets

FIG. 4

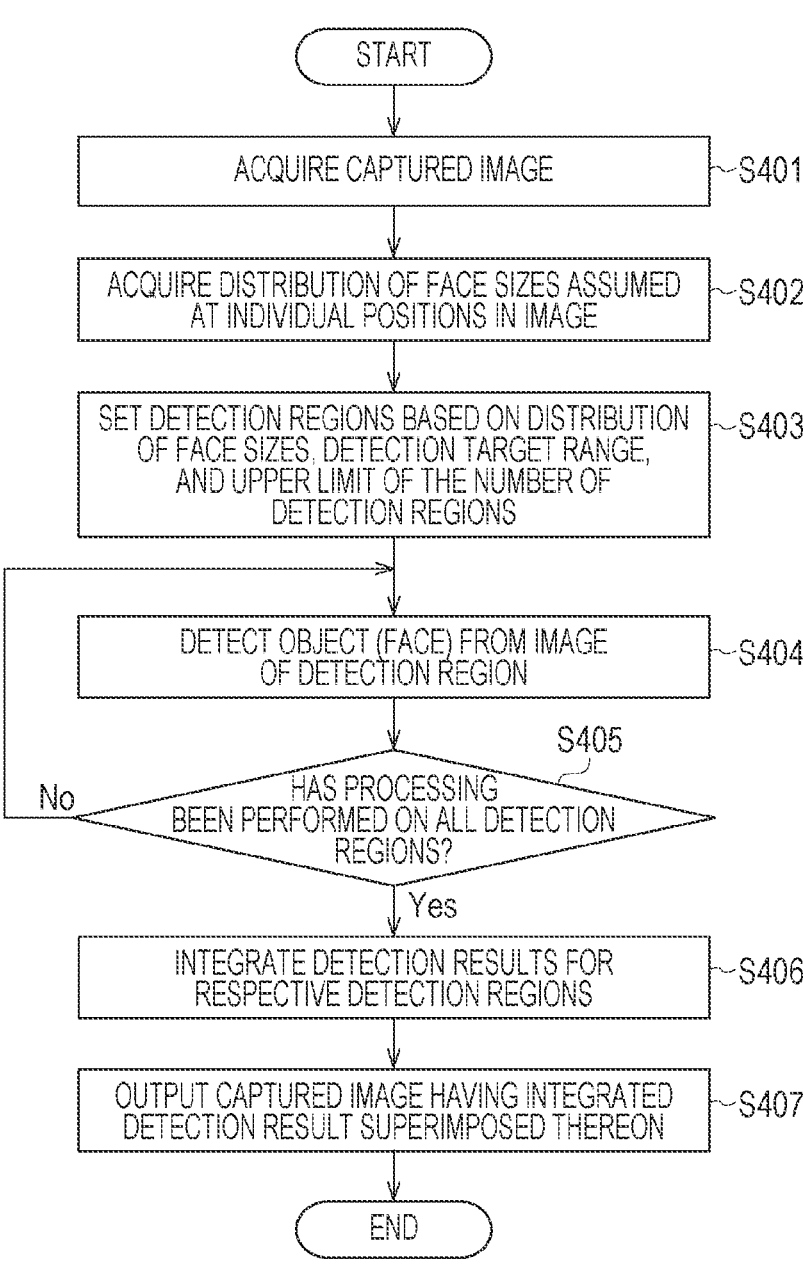

START

ACQUIRE CAPTURED IMAGE ～S401

ACQUIRE DISTRIBUTION OF FACE SIZES ASSUMED AT INDIVIDUAL POSITIONS IN IMAGE ～S402

SET DETECTION REGIONS BASED ON DISTRIBUTION OF FACE SIZES, DETECTION TARGET RANGE, AND UPPER LIMIT OF THE NUMBER OF DETECTION REGIONS ～S403

DETECT OBJECT (FACE) FROM IMAGE OF DETECTION REGION ～S404

S405
HAS PROCESSING BEEN PERFORMED ON ALL DETECTION REGIONS?
No
Yes

INTEGRATE DETECTION RESULTS FOR RESPECTIVE DETECTION REGIONS ～S406

OUTPUT CAPTURED IMAGE HAVING INTEGRATED DETECTION RESULT SUPERIMPOSED THEREON ～S407

END

INFORMATION PROCESSING APPARATUS, INFORMATION PROCESSING METHOD, AND STORAGE MEDIUM FOR DETECTING AN OBJECT AS A DETECTION TARGET FROM AN IMAGE

BACKGROUND OF THE INVENTION

Field of the Invention

The present invention relates to an information processing technique of detecting an object or the like as a detection target from an image.

Description of the Related Art

In recent years, a learning model based on machine learning has often been used as information processing of detecting an object or the like as a detection target from an image. In a learning model used to detect an object or the like as a detection target from an image, the size of data to be input to the learning model is predetermined. Thus, preprocessing such as reduction or division is performed on the image so as to satisfy the predetermined input size. The learning model may have a range in which the detection accuracy is high with respect to the ratio of the size of an object as a detection target to the size of an input image.

The techniques described in Japanese Patent Laid-Open Publication No. 2018-22340 and Japanese Patent Laid-Open Publication No. 2020-149565 take into consideration the ratio of the size of a detection target to the size of an input image. Japanese Patent Laid-Open Publication No. 2018-22340 discloses a technique of dividing a captured image into small regions of different sizes such that the ratio of the size of a detection target to the size of a small region is substantially constant, and reducing the image of each small region to satisfy the input size of a learning model. Japanese Patent Laid-Open Publication No. 2020-149565 discloses a technique of dividing a captured image while allowing divided regions to overlap each other such that the ratio of the size of a detection target to the size of each divided region is within a range in which the accuracy rate is high.

However, for example, when an object as a detection target is present on a boundary line of a divided region, a less reliable detection result may be obtained. For example, one object may be erroneously detected as two objects, or no object may be detected. Detection processing may be performed again on each divided region, but this increases processing load (processing cost). In addition, for example, when no object is detected, re-detection processing is not performed. In this case, a detection result "undetected" is obtained.

SUMMARY OF THE INVENTION

The present invention is directed to reducing the occurrence of erroneous detection, undetected state, and the like while suppressing an increase in processing load generated to detect a detection target from an image. An information processing apparatus according to one embodiment of the present invention includes an image acquisition unit configured to acquire an image; a size acquisition unit configured to acquire detection target sizes at individual positions in the image; a region setting unit configured to set a plurality of detection regions for the image; and a detection unit configured to detect, from the image acquired by the image acquisition unit, a detection target in each of the detection regions. The region setting unit is configured to set, based on the detection target sizes at the individual positions acquired by the size acquisition unit, sizes of the detection regions at the individual positions in the image and overlapping ranges between adjacent detection regions.

Further features of the present invention will become apparent from the following description of embodiments with reference to the attached drawings.

BRIEF DESCRIPTION OF THE DRAWINGS

FIG. 4 is a flowchart of entire information processing for performing object detection.

DESCRIPTION OF THE EMBODIMENTS

Figure 1:
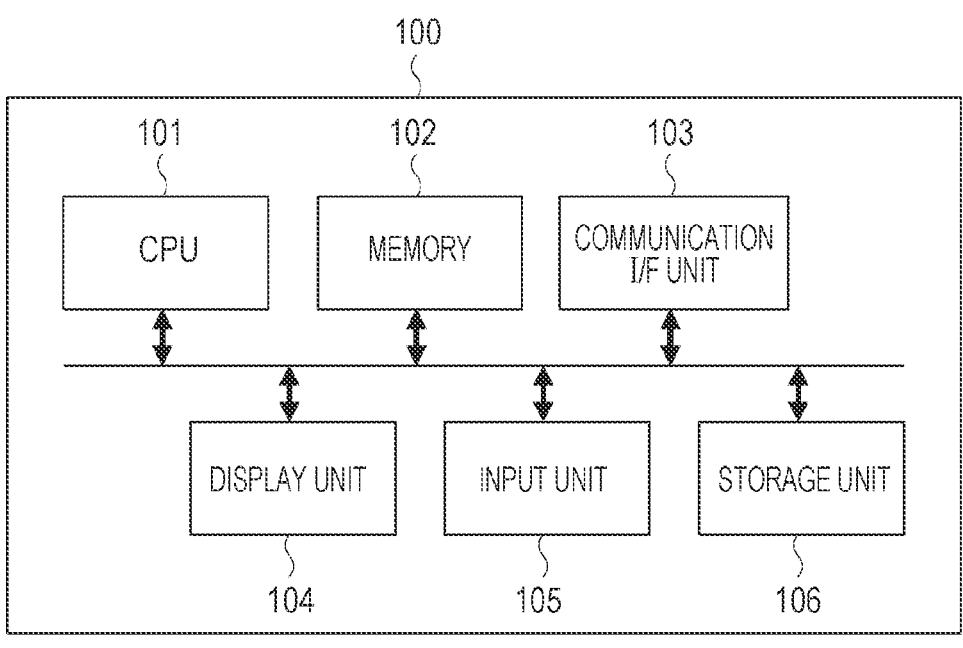
FIG. 1 is a diagram illustrating an example configuration of an information processing apparatus.

Hereinafter, embodiments of the present invention will be described with reference to the drawings. The embodiments described below are not intended to limit the present invention, and not all combinations of features described in the embodiments are necessarily essential to solutions according to the present invention. The configuration of each embodiment may be modified or changed as appropriate depending on the specifications and various conditions (use condition, use environment, etc.) of an apparatus to which the present invention is applied. Some features of the following embodiments may be combined as appropriate. In the following embodiments, the same components are denoted by the same reference numerals.

First Embodiment

FIG. 1 is a diagram illustrating an example of a hardware configuration of an information processing apparatus 100 according to the present embodiment.

The information processing apparatus 100 according to the present embodiment includes a central processing unit (CPU) 101, a memory 102, a communication interface (I/F) unit 103, a display unit 104, an input unit 105, and a storage unit 106. The CPU 101, the memory 102, the communication I/F unit 103, the display unit 104, the input unit 105, and the storage unit 106 are connected to each other via a system bus so as to be capable of communicating with each other. The information processing apparatus 100 according to the present embodiment may further include another component.

The CPU 101 controls the entire information processing apparatus 100. The CPU 101 controls the operations of individual functional units connected thereto via the system bus, for example. The memory 102 stores data, programs, and the like used by the CPU 101 for processing. The memory 102 also functions as a main memory, a work area, and the like of the CPU 101. The CPU 101 executes processing in accordance with an information processing program according to the present embodiment stored in the memory 102, thereby implementing the functional configuration of the information processing apparatus 100 illustrated in FIG. 2, which will be described below, and processing of the flowcharts illustrated in FIG. 4 and FIG. 5, which will be described below. A graphics processing unit (GPU) may be used instead of the CPU, or the CPU and the GPU may appropriately share their roles and operate in cooperation with each other.

The communication I/F unit 103 is an interface that connects the information processing apparatus 100 to a network. The connection to the network may be performed in either a wired manner or a wireless manner. The display unit 104 includes a display device such as a liquid crystal display, and displays an image, a result of processing by the CPU 101, a graphical user interface (GUI), and the like. The input unit 105 includes an operation device such as a mouse or a button, and inputs a user operation to the information processing apparatus 100. The storage unit 106 stores, for example, various kinds of data necessary for the CPU 101 to perform processing in accordance with a program. The storage unit 106 stores, for example, various kinds of data obtained through processing performed by the CPU 101 in accordance with a program. The data, program, and the like used by the CPU 101 for processing may be stored in the storage unit 106 instead of the memory 102.

The information processing apparatus 100 according to the present embodiment is capable of executing information processing. The information processing includes image analysis of detecting or tracking an object or the like as a detection target in an image captured by an image capturing apparatus such as a monitoring camera, and estimating an attribute of the object. The information processing also includes estimation of the number of objects using a result of the image analysis. In the present embodiment, a human face is used as an example of an object as a detection target. The present embodiment is not limited to this example, and is applicable to any system that detects various objects as detection targets, such as a vehicle and an animal.

The present embodiment describes an example in which a learning model based on machine learning is used to detect an object (human face) as a detection target from an image. In the case of using a learning model to detect an object or the like, processing of reducing or dividing an image is performed so as to satisfy an input size predetermined for the learning model, as described above. As described above, the learning model has a range in which the accuracy of object detection is high with respect to the ratio of the size of an object as a detection target to the size of an input image. Thus, in the present embodiment, an image is divided or reduced to satisfy the input size of the learning model in consideration of a range in which the accuracy of object detection is high, and detection regions for detecting objects as detection targets are set.

Figure 2:
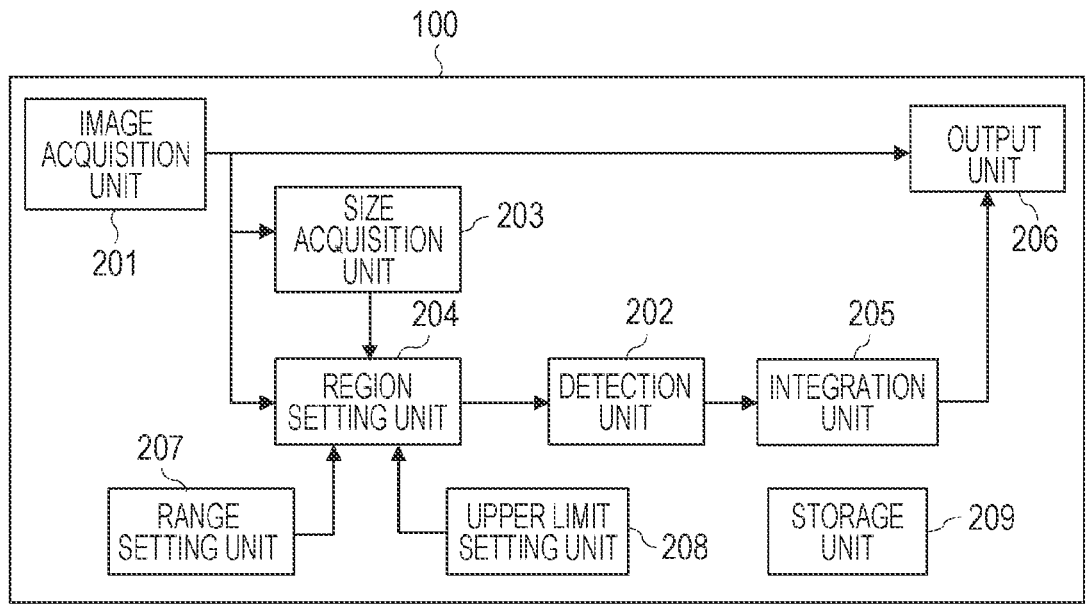
FIG. 2 is a diagram illustrating an example functional configuration of the information processing apparatus.

FIG. 2 is a functional block diagram illustrating an example functional configuration of the information processing apparatus 100 according to the present embodiment. The information processing apparatus 100 according to the present embodiment includes an image acquisition unit 201, a detection unit 202, a size acquisition unit 203, a region setting unit 204, an integration unit 205, an output unit 206, a range setting unit 207, an upper limit setting unit 208, and a storage unit 209.

The image acquisition unit 201 acquires an image to be subjected to object detection. In the present embodiment, it is assumed that an image to be subjected to object detection is an image captured by an image capturing apparatus such as a monitoring camera, and is acquired from the outside through the communication OF unit 103. Hereinafter, image data captured by an image capturing apparatus such as a monitoring camera and acquired by the image acquisition unit 201 will be referred to as a "captured image" as appropriate. The captured image is, for example, an RGB image of 1080×720 pixels having a width in the horizontal direction (lateral direction) of 1080 pixels and a height in the vertical direction (height direction) of 720 pixels. The image acquired by the image acquisition unit 201 is not limited to an RGB image of 1080×720 pixels, and any image may be used as an input image. For example, the width in the horizontal direction or the height in the vertical direction may vary. In addition, the captured image is not limited to an image directly acquired from the image capturing apparatus, and may be an image read out after being temporarily recorded on a recording medium or the like, or an image existing on a network.

The size acquisition unit 203 acquires a distribution of detection target sizes assumed at the positions of individual pixels on the captured image acquired by the image acquisition unit 201, that is, a distribution of object sizes of detection targets at individual positions on the image. The size acquisition unit 203 may acquire a distribution of face sizes by estimating, through interpolation, an average face size of faces at a certain position on an image in response to user's designation of face sizes at several positions on the image via the input unit 105 illustrated in FIG. 1. The size acquisition unit 203 may detect faces from the captured image, estimate, through interpolation, an average face size at a certain position on the image from a result of the detection, and acquire a distribution of face sizes. The size acquisition unit 203 may acquire face sizes and the distribution thereof by using another method. In a method of estimation a face size using interpolation, for example, when a face size at coordinates (x, y) on an image is represented by s, it is assumed that the face size s can be expressed by the coordinates x and y and one or more unknown parameters. For example, it is assumed that s=ax+by+c holds. In this example, a, b, and c are unknown parameters. The size acquisition unit 203 calculates the unknown parameters by using, for example, statistical processing such as the least squares method, by using a set of the position and size of a face designated by the user or a set of the position and size of a face detected by face detection.

The region setting unit 204 sets a plurality of detection regions on the captured image. At this time, the region setting unit 204 sets the detection regions such that adjacent detection regions overlap each other without omission. Although details will be described below, the region setting unit 204 according to the present embodiment sets the sizes of detection regions and overlapping ranges between adjacent detection regions, based on the distribution of detection target sizes (face sizes) assumed at individual positions and acquired by the size acquisition unit 203. Hereinafter, in the present embodiment, an image cut out from the captured image based on a detection region set by the region setting unit 204, that is, an image of a detection region in which object detection is performed by the detection unit 202 in a subsequent stage, will be referred to as a "detection region image". The region setting unit 204 inputs, to the detection unit 202, detection region images cut out for respective detection regions from the captured image.

The detection unit 202 detects an object (a human face in the present embodiment) as a detection target from the detection region image of each detection region set by the region setting unit 204. In the present embodiment, the detection unit 202 detects a region of a human face from each detection region image by using a learning model based on machine learning, and outputs face detection results for individual detection regions. In the present embodiment, it is assumed that the detection unit 202 performs object detection regarding a plurality of attributes (classes) on the detection region images input thereto. The present embodiment describes an example in which the detection unit 202 outputs a face detection result by using a learning model trained by machine learning so as to be capable of detecting a "face wearing glasses" and a "face not wearing glasses" included in a detection region image. The detection of a "face wearing glasses" and a "face not wearing glasses" can be implemented by applying, for example, the technique described in J. Redmon, A. Farhadi, "YOLO9000: Better Faster Stronger", Computer Vision and Pattern Recognition (CVPR) 2016.

In the present embodiment, a detection result output by the detection unit 202 is information indicating the position and size of a detected face, the attribute (class) of the face, and the reliability of the detection result. The information indicating the position and size of the face is, for example, coordinates defining a rectangular frame enclosing the face (for example, upper left coordinates (x1, y1) and lower right coordinates (x2, y2) of a rectangle). The information indicating the attribute of the face is information indicating whether the face is a "face wearing glasses" or a "face not wearing glasses". The information indicating the reliability of the detection result is output as a value of a real number of 0 to 1, where 0 represents the lowest reliability and 1 represents the highest reliability, for example. In the following description, a rectangular frame enclosing a face will be referred to as a "detection frame", the attribute of a face will be referred to as an "attribute", and the reliability of a detection result will be referred to as "reliability". The detection result is not limited to these examples, and may be any form of information as long as the position and size of the detected face, the attribute of the face, and the reliability of the detection result are recognizable.

The accuracy of detection by the detection unit 202 is correlated with a face size in a detection region image. Specifically, for example, if the face size is too small relative to the size of the detection region image, pixels of the detection region image are crushed when the detection region image is reduced to a size to be input to the detection unit 202, and the detection accuracy decreases. On the other hand, if the face size is larger than the detection region image, a portion indicating a feature of the face, such as the eyes or the nose, is not included in the detection region image in some cases, and the detection accuracy decreases.

In machine learning, learning is performed to improve the detection accuracy by using learning images. Thus, if a face size relative to a detection region image is close to a face size relative to the size of a learning image, the detection accuracy increases. In other words, in the learning model, there is a range in which the detection accuracy is high in the ratio of the size of a face as a detection target to the size of a detection region image. Thus, the region setting unit 204 determines the sizes of detection regions to be arranged at individual positions on the captured image such that a face size in each detection region is a size with which a highly accurate detection result can be obtained with respect to the size of the detection region (the size of the detection region image).

For example, when a face is present in a boundary portion of a detection region, that is, when a face is split across a boundary portion of a detection region, detection accuracy may decrease. When a face is present in a boundary portion of a detection region, for example, a part of the face may be outside the detection region, glasses may be outside the detection region, or the face may be located across a plurality of detection regions. For example, when a part of the face is outside the detection region, a portion indicating a feature of the face, such as the eyes or the nose, is not within the detection region, or the contour of the face is not detectable, and thus detection accuracy may decrease. In addition, for example, when glasses serving as a criterion for determining whether the face is a "face wearing glasses" or a "face not wearing glasses" are outside the detection region, it is not possible to determine the attribute. Furthermore, for example, when a face is located across a plurality of detection regions, detection results for the respective detection regions may be output for the one face.

In such a case where a face is present in a boundary portion of a detection region (a face is split across a boundary portion), detection accuracy may decrease. In this case, it is effective to perform object detection again in order to increase the accuracy of the attribute and the detection frame at the boundary of the detection region or to integrate a plurality of detection results for one face later. However, when there are many detection targets, there are many portions to be subjected to redetection processing, and the number of times of detection processing is indefinite. In addition, redetection processing increases the processing load (processing cost). Furthermore, for example, when no face is detected, redetection processing is not performed, and thus a detection result "undetected" is obtained.

Thus, in the case of setting a plurality of detection regions by, for example, dividing a captured image, the information processing apparatus 100 according to the present embodiment sets the sizes of the individual detection regions and overlapping ranges between adjacent detection regions, based on the detection target sizes assumed at individual positions in the image. In the present embodiment, the region setting unit 204 sets an overlapping range between adjacent detection regions such that the detection regions overlap each other by a width having a predetermined ratio with respect to the detection target size at a corresponding position. In the present embodiment, it is assumed that the predetermined ratio is 100%. That is, the region setting unit 204 sets the width of the overlapping range in which the adjacent detection regions overlap each other to a width capable of including a detection target having a size at the corresponding position. In the present embodiment, a detection target is a face, and thus the region setting unit 204 sets, between adjacent detection regions, an overlapping range capable of including the size of a face located at a boundary portion between the adjacent detection regions. Accordingly, a face located in the boundary portion between the adjacent detection regions is included in at least one of the adjacent detection regions. This may prevent a situation from occurring where a portion indicating a feature of the face, such as the eyes or the nose, is not within a detection region, or the contour of the face is not detectable, and detection accuracy increases. Details of detection regions and an overlapping range will be described below.

The region setting unit 204 sets the plurality of detection regions so as to cover the entire detection target range on the captured image. In the present embodiment, a detection target range is a range in which all the plurality of detection regions set by the region setting unit 204 are arranged in the captured image, and is a range in which face detection processing is performed. The detection target range is set by the range setting unit 207 in response to, for example, designation by the user. Details of the detection target range will be described below.

The upper limit setting unit 208 sets an upper limit of the number of detection regions. The upper limit of the number of detection regions may be set by the user, or may be calculated from the processing time allowed for the entire detection processing if the time for detection processing per detection region is known. Details of the upper limit of the number of detection regions will be described below.

The integration unit 205 integrates detection results obtained for the respective detection regions by the detection unit 202.

That is, the integration unit 205 integrates detection results of detection targets detected by the detection unit 202, based on the arrangement of the detection regions set by the region setting unit 204. In the present embodiment, the integration of the detection results for the respective detection regions has two stages: integration within a detection region at the same position and integration between adjacent detection regions. Details of the integration processing will be described below.

Figure 3A:
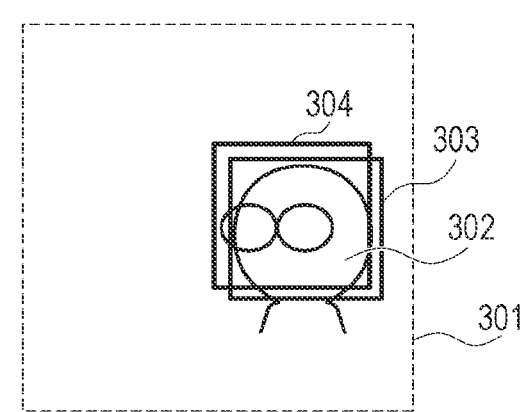
FIGS. 3A, 3B, and 3C are explanatory diagrams of a detection result of an object, integration processing, and an example of erroneous detection.
Figure 3B:
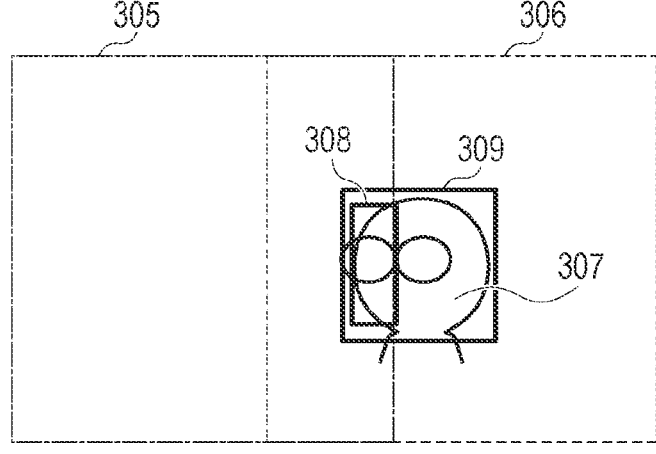
Figure 3C:
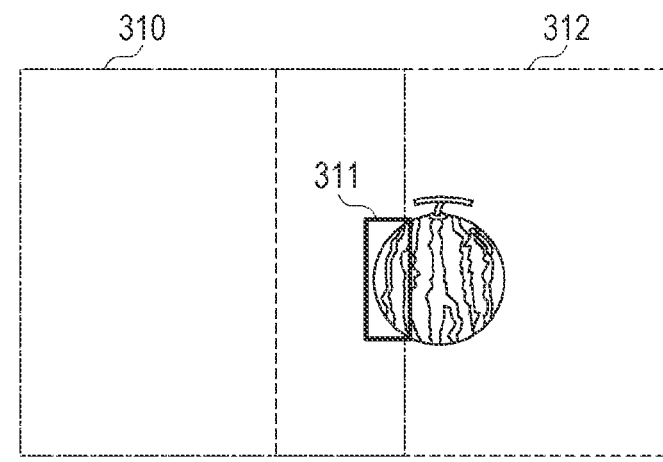

FIGS. 3A to 3C are diagrams for describing detection result integration processing performed by the integration unit 205.

First, the processing of integrating detection results for a detection region at the same position among individual positions in an image will be described with reference to FIG. 3A.

In the detection processing using a learning model, a plurality of detection frames 303 and 304 may be output for an object 302, which is one detection target, in a detection region 301. In such a case, the integration unit 205 calculates an overlap ratio of the plurality of detection results. If the overlap ratio is larger than or equal to a predetermined threshold value, the integration unit 205 determines that the detection results indicate the same face and integrates the detection frames. In the present embodiment, the overlap ratio is calculated by intersection over union (IoU), and the threshold value is 0.5, for example. That is, if the quotient obtained by dividing a common portion of the two detection frames 303 and 304 by the union of the detection frames 303 and 304 is larger than or equal to 0.5, the integration unit 205 determines that the two detection results indicate the same face, and integrates the two detection results.

A method for integration may be, for example, non-maximum suppression (NMS) that excludes detection results other than a detection result having the highest reliability.

Next, integration processing between adjacent detection regions will be described with reference to FIG. 3B.

In the present embodiment, there is an overlapping range between adjacent detection regions, as described above. Thus, when there is a face included in the overlapping range at least partially, the detection unit 202 outputs detection results for the respective detection regions. IoU may be inappropriate for integrating these detection results. In the present embodiment, adjacent detection regions are set so as to overlap each other by an amount corresponding to a face size assumed at the position. Thus, there is an overlapping range between a detection region 305 and a detection region 306 illustrated in FIG. 3B. In the example in FIG. 3B, in which a part of a face 307 is included in the overlapping range between the detection regions 305 and 306, a detection frame 308 is obtained in the detection region 305, and a detection frame 309 is obtained in the detection region 306. In such a case, the IoU of the detection frames 308 and 309 has a small value and does not reach the threshold value for integrating the detection frames although the detection results indicate the same face. Thus, integration processing is not performed. Accordingly, the integration unit 205 performs, based on an inclusion relationship between the two detection frames, for example, processing of excluding one detection frame included in the other detection frame, without using IoU to integrate the detection results in the overlapping range between the adjacent detection regions. That is, in the example in FIG. 3B, the detection frame 308 included in the detection frame 309 is excluded. Furthermore, the integration unit 205 may use reliability in addition to the inclusion relationship between the two detection frames. For example, when the reliability of the detection frame 308 included in the detection frame 309 is lower than the reliability of the detection frame 309, the included detection frame 308 may be excluded. In this example, it may be determined that integration processing based on an inclusion relationship is to be performed, when a difference value obtained by subtracting the reliability of the included detection frame 308 from the reliability of the including detection frame 309 is larger than a predetermined threshold value.

Regarding the determination of erroneous detection, results for adjacent detection regions may be included in the determination criterion. FIG. 3C illustrates an example in which an object other than a human face as a detection target is erroneously detected by the detection unit 202. As illustrated in FIG. 3C, for example, it is assumed that a detection frame 311 is detected at a position across an edge of a detection region 310. The detection frame 311 is smaller than a face size assumed at the position. In such a case where the size of a detection frame detected as a face is obviously smaller than a face size assumed at the position, there is a high possibility that the detection region 310 includes only a part of a face. In this case, a detection frame including the face detected in the detection frame 311 should be detected in a detection region 312 adjacent to the detection region 310. However, if no face is detected in the adjacent detection region 312, it can be determined that the detection frame 311 detected in the detection region 310 is an erroneous detection result indicating a part of another object. That is, if no face is detected in the adjacent detection region 312 that shares the overlapping range in which the detection frame 311 is detected in the detection region 310, the integration unit 205 determines that the detection frame 311 is an erroneously detected frame. In such a case, it is considered that the reliability of the detection result for the detection region 310 is low, or that the aspect ratio of the detection frame 311 is different from the aspect ratio of the detection result of a normal face. Thus, these things may also be used as a determination criterion.

The integration unit 205 performs the processing of integrating the detection results obtained by the detection unit 202 in the above-described manner.

The output unit 206 superimposes a detection result obtained from the detection by the detection unit 202 and the integration by the integration unit 205 on the captured image acquired by the image acquisition unit 201, and outputs the captured image. In the present embodiment, the output unit 206 outputs, for example, an image obtained by superimposing, on the captured image, a detection frame based on a detection result and corresponding to an attribute.

The storage unit 209 stores data used for processing in the functional units (201 to 208) of the information processing apparatus 100 illustrated in FIG. 2, data obtained as a processing result, and the like.

Next, an overall flow of the information processing performed by the information processing apparatus 100 will be described with reference to the flowchart in FIG. 4.

First, in S401, the image acquisition unit 201 acquires a captured image to be subjected to object detection as described above.

Subsequently, in S402, the size acquisition unit 203 acquires a distribution of face sizes assumed at individual positions in the captured image acquired by the image acquisition unit 201 as described above.

Furthermore, in S403, the region setting unit 204 sets a plurality of detection regions including the above-described overlapping range, based on the distribution of face sizes obtained from the size acquisition unit 203, the detection target range set by the range setting unit 207, and the upper limit of the number of regions set by the upper limit setting unit 208.

Subsequently, in S404, the detection unit 202 detects a face, which is an object as a detection target, from a detection region image cut out in accordance with a detection region set by the region setting unit 204.

Furthermore, in S405, the detection unit 202 determines whether object detection processing has been performed on all the detection regions set by the region setting unit 204. If there is an unprocessed detection region, the process returns to S404. On the other hand, if object detection processing has been performed on all the detection regions, the process of the information processing apparatus 100 proceeds to S406.

In S406, the integration unit 205 integrates detection results obtained for the respective detection regions by the detection unit 202 in the above described manner.

Thereafter, in S407, the output unit 206 outputs an image obtained by superimposing, on the captured image acquired by the image acquisition unit 201, a detection result obtained through the integration performed by the integration unit 205.

Next, a detailed flow of the detection region setting processing performed by the region setting unit 204 will be described with reference to the flowchart in FIG. 5. In the following description, it is assumed that the detection target range set by the range setting unit 207 is the entire captured image. Thus, the region setting unit 204 sets detection regions over the entire captured image without omission. In the present embodiment, it is assumed that images input to the learning model based on machine learning are square-shaped, and detection regions are set as square regions. Thus, in the following description, the size of a detection region is represented by the number of pixels on one side of the square detection region.

First, in S431, the region setting unit 204 acquires a distribution of face sizes at individual positions from the size acquisition unit 203. It is assumed here that the size acquisition unit 203 acquires a distribution of face sizes by estimating, through interpolation, an average face size at a certain position on the image, based on face sizes at several points set by the user at individual positions or faces detected at individual positions on the image, as described above. In the present embodiment, to simplify the description, it is assumed that a face size depends only on the y-coordinate system in the y-axis direction (vertical direction) on the image, and there is no change in the face size in the x-coordinate system in the x-axis direction (horizontal direction). That is, in estimation processing using interpolation, a face size s is assumed to be expressed by $s = by + c$, where s is the face size in the y-axis direction on the image. In this case, b and c are unknown parameters. The size acquisition unit 203 calculates the unknown parameters by statistical processing such as the least squares method, by using a set of the position and size of a face designated by the user or a set of the position and size of a face detected from the image.

Figure 6:
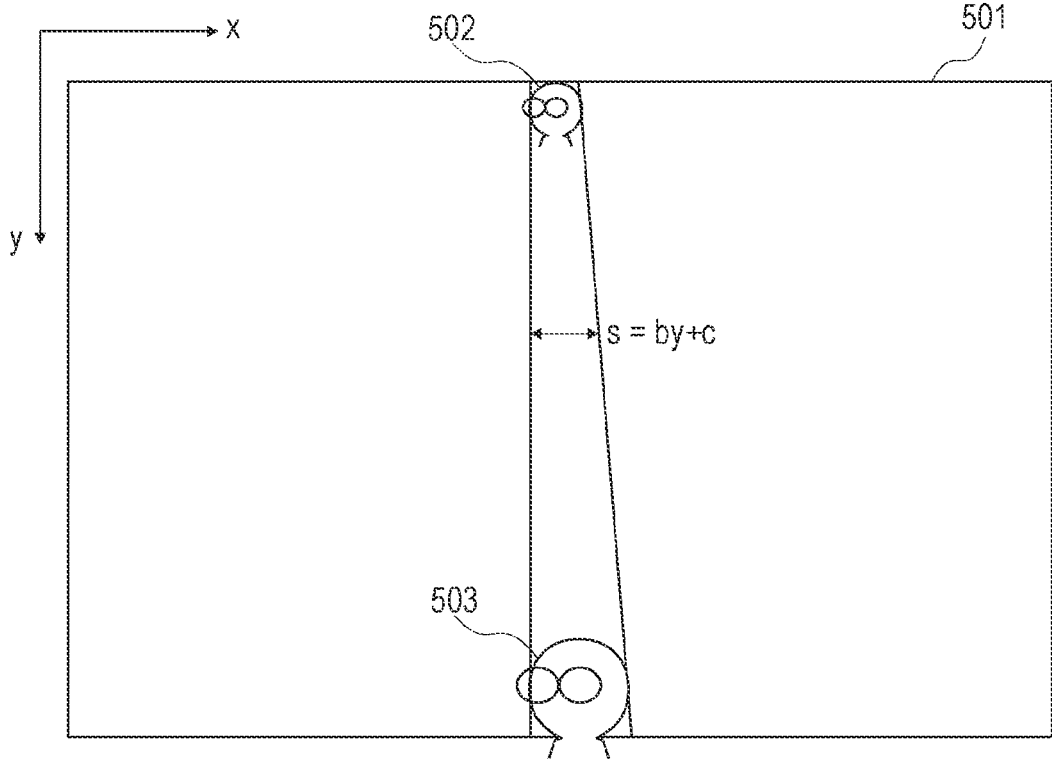
FIG. 6 is a diagram illustrating an example of face sizes and a distribution thereof according to a first embodiment.

FIG. 6 is a diagram illustrating an example of a distribution of the face size s depending on the y coordinate in a captured image 501.

In the present embodiment, it is assumed that the captured image acquired by the image acquisition unit 201 is an image captured from a position looking down on an object (person) as a detection target by an image capturing apparatus such as a monitoring camera installed at a position higher than the ground or a floor surface. Thus, in the captured image 501, a person appearing near the upper side is a person far from the image capturing apparatus, whereas a person appearing near the lower side is a person close to the image capturing apparatus. That is, in the captured image 501, the size of a face 502 of the person appearing near the upper side is smaller than the size of a face 503 of the person appearing near the lower side. The aspect ratio of the face size is constant at any position in the captured image, and the value (aspect ratio) is 1. That is, the vertical width of the face size at each position is equal to the face size s, which is the horizontal width of the face. Thus, as a result of acquiring a distribution of horizontal widths of face sizes at individual positions in the captured image, the vertical widths of the face sizes at the individual positions can be calculated from the aspect ratio of the face size determined in advance. In the present embodiment, when the user sets a face size at a certain position, the user may drag the face 502 or the face 503 to a certain position by using the input unit 105 and change the position and size of the face, or may input numerical values indicating the position and size.

Subsequently, in S432, the region setting unit 204 determines the size of a detection region in a region along the upper side of the image, based on a minimum face size assumed as the face size at the upper side of the image. In the present embodiment, a region along the upper side of the image is regarded as an uppermost row, and the region setting unit 204 determines the size of a detection region to be set in the uppermost row, based on a minimum face size assumed in the uppermost row.

As described above, the detection accuracy for a face in the detection unit 202 is correlated with a face size in a detection region image. When the face size is too small relative to the size of the detection region image, the detection accuracy decreases. A minimum face size causing no substantial decrease in detection accuracy depends on the learning model used in detection processing. In the present embodiment, it is assumed that there is no substantial decrease in detection accuracy when the horizontal width of the face size is larger than or equal to ¼ of the size of the detection region. In the present embodiment, the horizontal width of the face size is ¼ of the detection region size for convenience of illustration. Actually, however, when the input of the learning model has several hundred pixels, an appropriate face size is about ¹⁄₁₀, that is, several tens of pixels, in many cases. Thus, the minimum face size causing no substantial decrease in detection accuracy may be several tens of pixels, which is about ¹⁄₁₀ of the detection region size.

Figure 7:
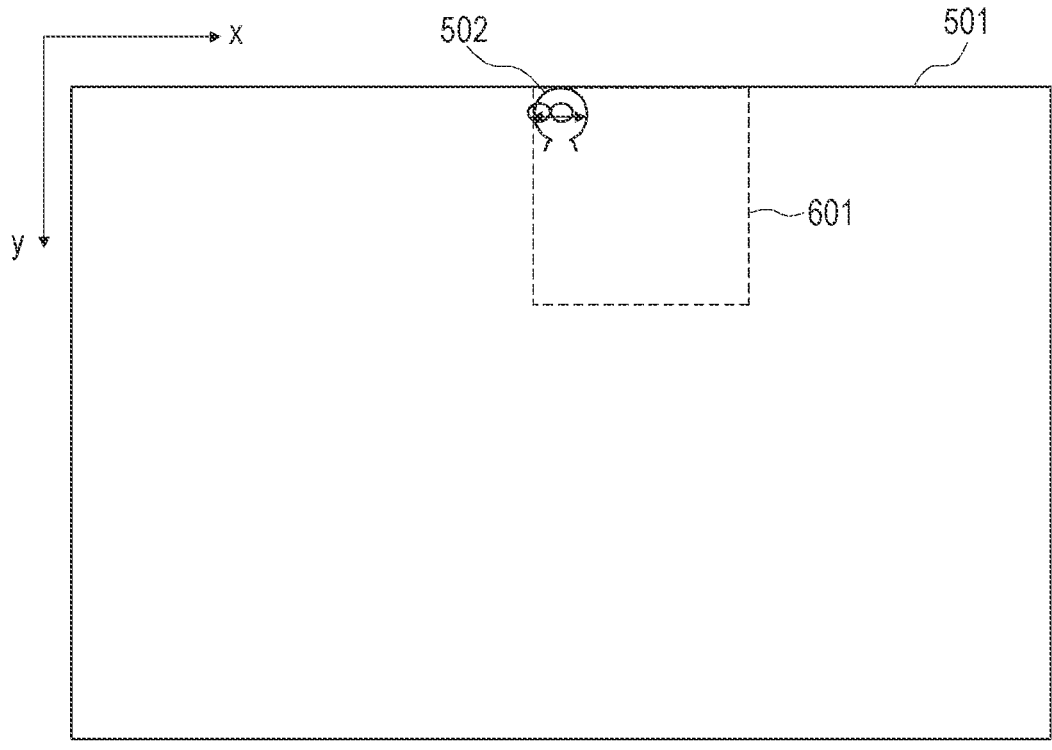
FIG. 7 is an explanatory diagram of an example of setting a detection region in a first row according to the first embodiment.

FIG. 7 is a diagram illustrating a state in which a region having a size four times a face size assumed at a position near the upper side of the image has been set as a detection region in the uppermost row along the upper side. That is, the region setting unit 204 sets, based on the size of the face 502 at the upper side of the captured image, a region having a size four times the size of the face 502 as a detection region 601 in the uppermost row. After determining the size of the detection region in the uppermost row in S432, the region setting unit 204 proceeds to S433.

In S433, the region setting unit 204 determines whether the detection region set in the above-described manner reaches the lower end of the detection target range, that is, the lower end of the captured image. According to the above description, only the detection region in the uppermost row has been set. Thus, the region setting unit 204 determines in S433 that the detection region does not reach the lower end of the detection target range, and proceeds to S434.

In S434, the region setting unit 204 sets a detection region in the row next to the uppermost row (the second row because the uppermost row is the first row). In the present embodiment, the region setting unit 204 sets a detection region in the second row, based on the largest face size (maximum face size) among the faces included in the detection region set in the first row (uppermost row). Specifically, the detection region set in the second row by the region setting unit 204 has an upper end that corresponds to the top portion of a face assumed at the position of the lowermost end of the detection region in the first row (uppermost row) among faces included in the detection region set in the first row, and has a minimum face size that is the size of the face.

Figure 8:
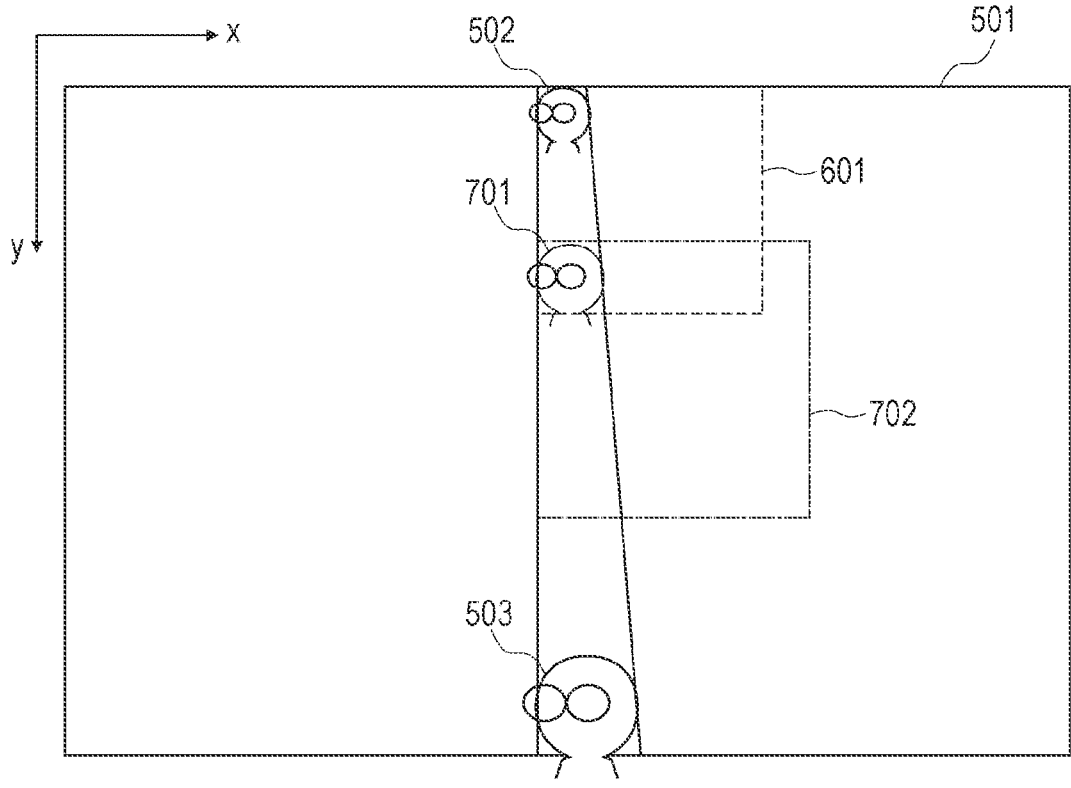
FIG. 8 is an explanatory diagram of a detection region and an overlapping range in a second row according to the first embodiment.

FIG. 8 is a diagram illustrating a state in which a detection region in the second row has been set. That is, the region setting unit 204 sets a detection region 702 as a detection region in the second row. The detection region 702 has a size four times the size of a face 701 that is included in the detection region 601 in the first row and that is assumed at the lowermost end of the detection region 601, and has an upper end that corresponds to the top portion of the face 701. As can be seen in the example in FIG. 8, an overlapping range corresponding to the size of the face 701 is present in the y-axis direction between the detection region 601 set in the first row and the detection region 702 set in the second row. The region setting unit 204 determines the size of the detection region 702 in the second row in S434, and then returns to S433.

When the process proceeds to S433 after the detection region in the second row has been set, the region setting unit 204 determines, similarly to the above, whether the set detection region reaches the lower end of the detection target range, that is, the lower end of the captured image. According to the above description, the detection regions in the first and second rows have been set, but the detection regions do not reach the lower end of the detection target range. Thus, the region setting unit 204 proceeds to S434.

In S434, the region setting unit 204 sets a detection region in the row next to the second row (third row). The detection region in the third row set at this time by the region setting unit 204 has an upper end that corresponds to the top portion of a face assumed at the lowermost end of the detection region in the second row among faces included in the detection region in the second row, and has a minimum detection size that is the size of the face.

Figure 9:
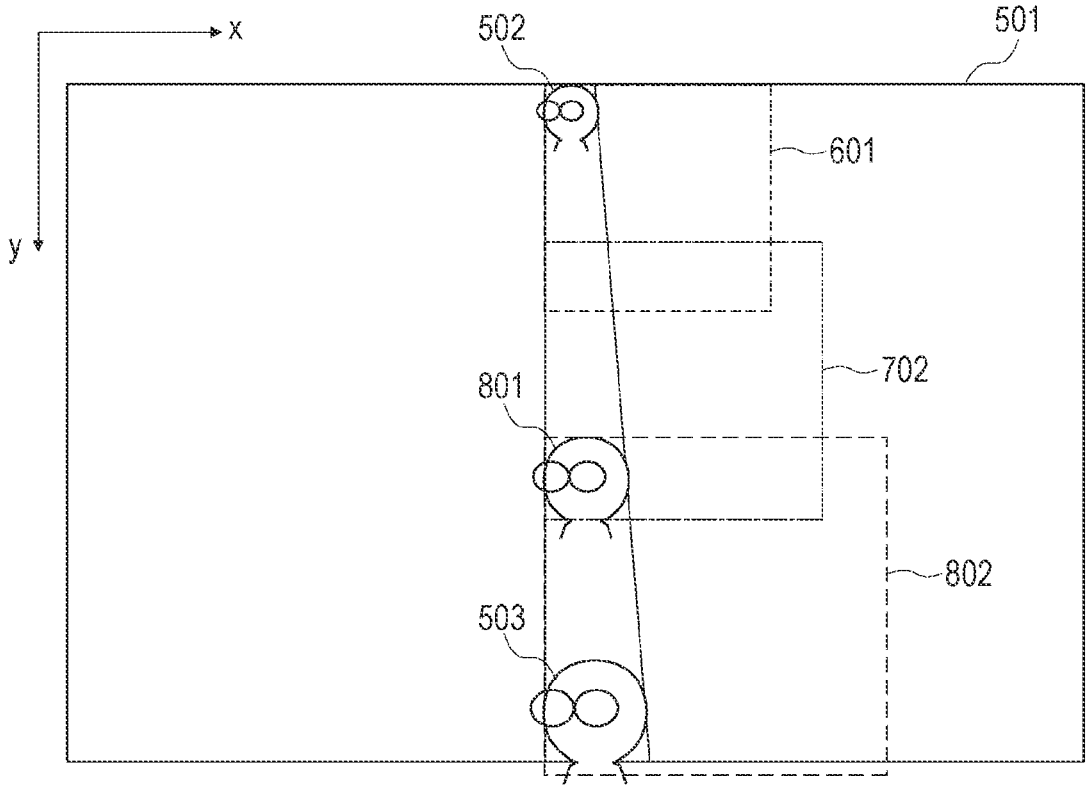
FIG. 9 is an explanatory diagram of a detection region and an overlapping range in a third row according to the first embodiment.

FIG. 9 is a diagram illustrating a state in which a detection region in the third row has been set. That is, the region setting unit 204 sets a detection region 802 as a detection region in the third row. The detection region 802 has a size four times the size of a face 801 that is included in the detection region 702 in the second row and that is located at the lowermost end of the detection region 702, and has an upper end that corresponds to the top portion of the face 801.

As illustrated in the example in FIG. 9, the detection region 802 in the third row reaches the lower end of the detection target range, that is, the lower end of the captured image. Thus, the region setting unit 204 determines in S433 that the detection region reaches the lower end of the detection target range, and proceeds to S435.

In S435, the region setting unit 204 sets an overlapping range between detection regions adjacent in the x-axis direction (horizontal direction) in each of the first to third rows, based on the maximum value of the face size included in the detection region set for each row in the above-described manner. Furthermore, the region setting unit 204 calculates the number of detection regions to be set in the x-axis direction for each row, based on the overlapping range between the detection regions adjacent in the x-axis direction set for each row. In the present embodiment, the number of detection regions set by the region setting unit 204 is a minimum number that satisfies a predetermined condition for setting an overlapping range in accordance with the size of a detection target (face) and a predetermined condition for setting the size of a detection region. In the present embodiment, the predetermined condition for setting an overlapping range is a condition for determining the width of an overlapping range, and is a width having a predetermined ratio with respect to the detection target size (face size) at each position in the image. In the present embodiment, the predetermined ratio with respect to the detection target size at each position is 100%, as described above. In the present embodiment, the predetermined condition for setting the size of a detection region is a condition related to a size that can ensure detection accuracy based on a relationship between the detection target size and the size of a detection region. In the present embodiment, the size that can ensure detection accuracy based on a relationship between the detection target size and the size of a detection region is a size that can maintain the accuracy in detection using the learning model, as described above.

Figure 10A:
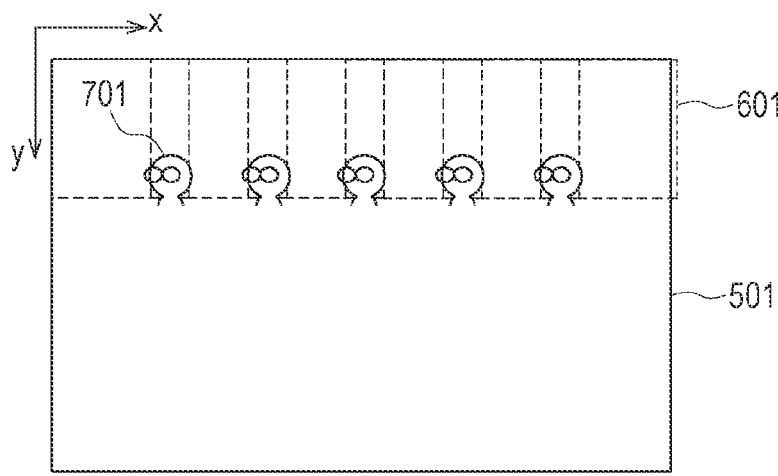
FIGS. 10A, 10B, and 10C are explanatory diagrams of the numbers of detection regions and overlapping ranges in individual rows according to the first embodiment.

FIG. 10A is a diagram illustrating an example in which the number of detection regions in the x-axis direction (horizontal direction) is calculated in the uppermost row (first row), and detection regions of the number are arranged in the x-axis direction. As illustrated in FIG. 10A, among faces included in the detection region 601 in the uppermost row (first row), the face having the largest size is the face 701 assumed at the position of the lowermost end of the detection region 601. Thus, the region setting unit 204 determines the width of an overlapping range between detection regions adjacent in the x-axis direction, based on the size of the face 701 assumed at the position of the lowermost end of the detection region 601. That is, the region setting unit 204 sets the width of an overlapping range between detection regions adjacent in the x-axis direction in the uppermost row such that the width is capable of including the horizontal width of the face 701 having a maximum face size that can be included in the detection region 601. As a result of setting the width of the overlapping range in this manner, the uppermost row (first row) includes at least one detection region including a face assumed at a position above the face 701. FIG. 10A illustrates an example in which six detection regions having overlapping ranges in the x-axis direction are set.

The region setting unit 204 calculates the number n of detection regions in the uppermost row (first row) by using the following equation (1). In equation (1), s is the horizontal width of the face 701, w is the horizontal width of the captured image (the horizontal width of the detection target range), and d is the size of the detection region 601. In addition, ceil( ) is a ceiling function.

$$n = \text{ceil}((w-s)/(d-s)) \qquad (1)$$

In the second row, similarly to the first row (uppermost row), overlapping ranges between detection regions adjacent in the x-axis direction and the number of detection regions are set.

Figure 10B:
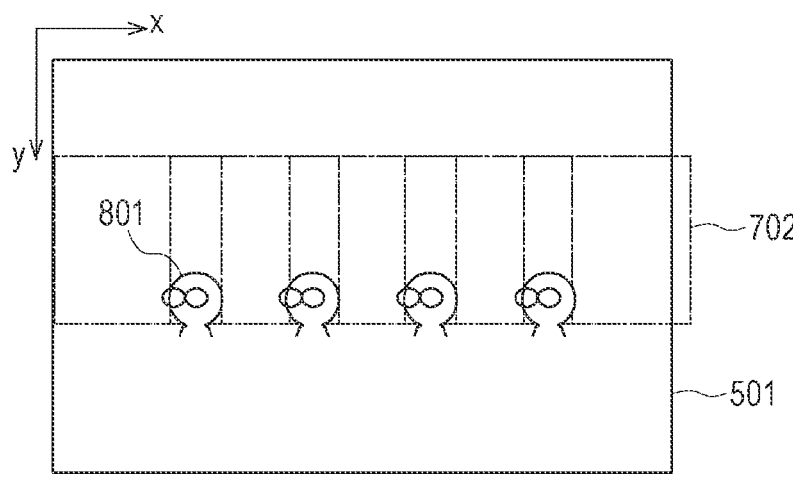

FIG. 10B is a diagram illustrating an example in which overlapping ranges are set between the detection regions 702 adjacent in the x-axis direction in the second row, the number of detection regions is calculated, and the detection regions are arranged in the x-axis direction. That is, in the second row, the face having a maximum face size included in the detection region 702 is the face 801 at the position of the lowermost end of the detection region 702. Thus, the region setting unit 204 determines the width of an overlapping range between detection regions adjacent in the x-axis direction, based on the size of the face 801.

In addition, the region setting unit 204 calculates the number n of detection regions in the second row by using equation (1), where s is the horizontal width of the face 801 and d is the size of the detection region 702. Accordingly, the second row includes at least one detection region including a face assumed at a position above the face 801. FIG. 10B illustrates an example in which five detection regions having overlapping ranges in the x-axis direction are set.

Figure 10C:
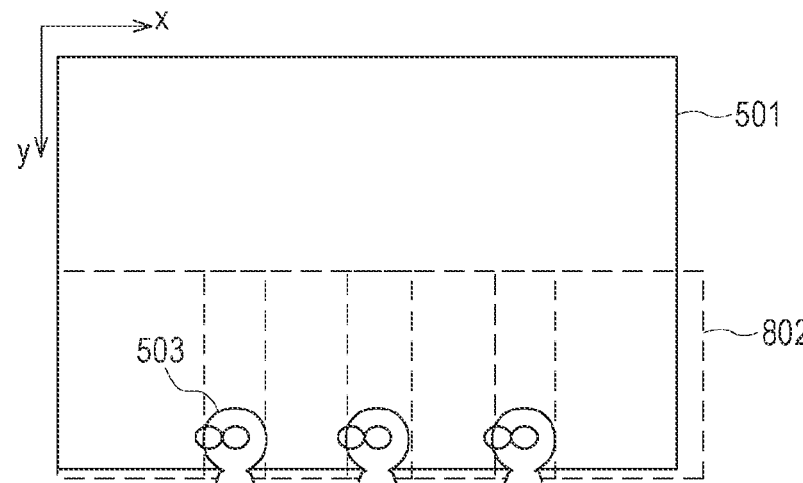

In the third row, similarly to the above, overlapping ranges between detection regions adjacent in the x-axis direction and the number of detection regions are set. FIG. 10C is a diagram illustrating an example in which overlapping ranges are set between the detection regions 802 adjacent in the x-axis direction in the third row, the number of detection regions is calculated, and the detection regions are arranged in the x-axis direction. The horizontal width of a face used to calculate the number of detection regions in the third row illustrated in FIG. 10C is not the face size assumed at the position of the lower end of the detection region in the third row, but the size of the largest face 503 assumed at the lowermost end of the detection target range. FIG. 10C illustrates an example in which four detection regions having overlapping ranges in the x-axis direction are set.

Figure 11:
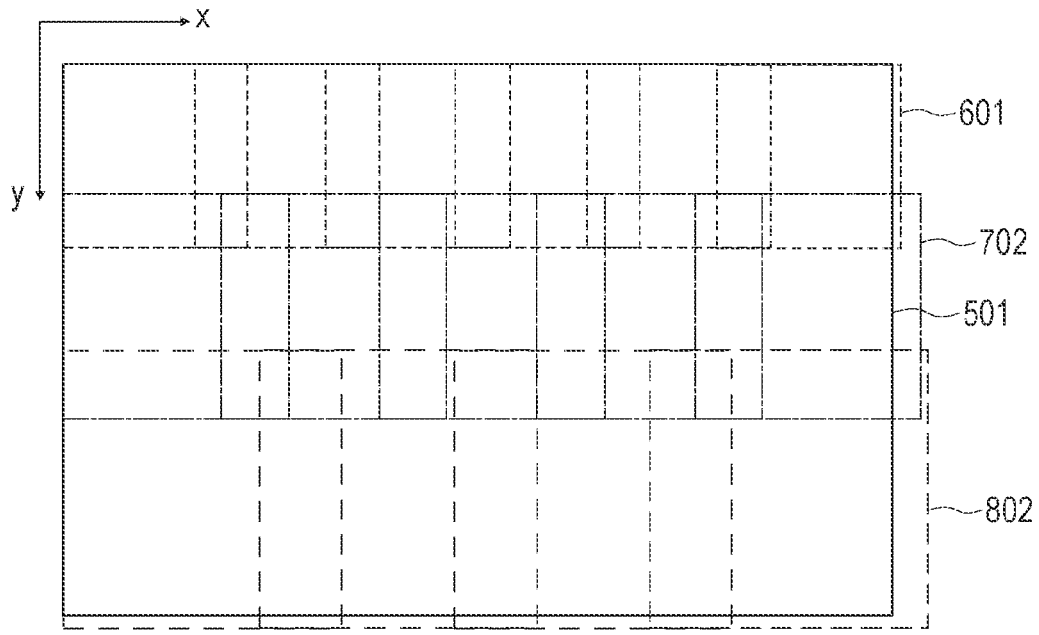
FIG. 11 is a diagram illustrating an example of arrangement of all detection regions according to the first embodiment.

FIG. 11 is a diagram illustrating a state in which all the detection regions 601, 702, and 802 of the minimum number satisfying the conditions of the overlapping range width and the detection region size corresponding to the face size are arranged in each of the first to third rows so as to cover the detection target range in the above-described manner.

After setting all the detection regions for the detection target range in the above-described manner, the region setting unit 204 adjusts, in S436, each detection region so that all the detection regions 601, 702, and 802 fall within the detection target range (the range of the captured image 501). Specifically, the region setting unit 204 arranges the detection regions such that the detection regions at both ends are aligned with the positions of both ends of the detection target range (captured image) in each row, and then performs adjustment to arrange the remaining detection regions at equal intervals.

Figure 12A:
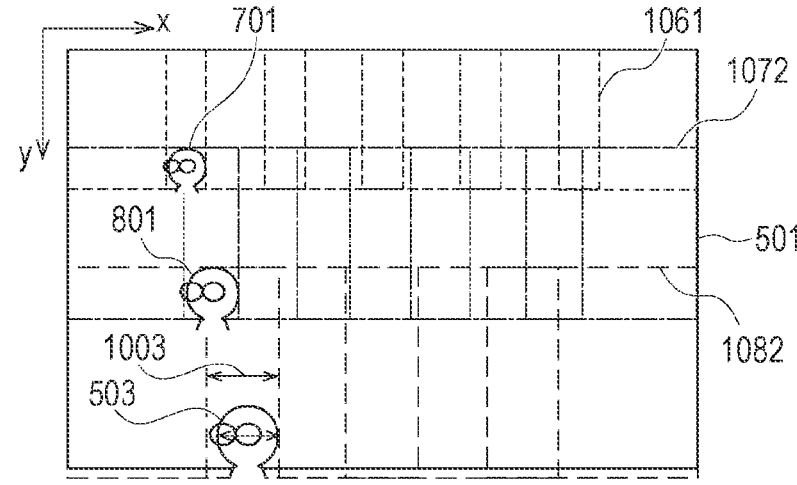
FIGS. 12A, 12B, and 12C are explanatory diagrams of adjustment of detection regions according to the first embodiment.

FIG. 12A is a diagram illustrating an arrangement state of detection regions 1061, 1072, and 1082 after the adjustment processing in S436 has been performed in each row. For reference, FIG. 12A also illustrates the faces 701, 801, and 503 used to set the overlapping ranges between the adjacent detection regions in each row.

As illustrated in FIG. 12A, the detection region 1082 in the lowermost row, which is the third row, may extend off the lower side of the detection target range. The minimum face size that can be accurately detected in the detection region 1082 in the lowermost row is the size of the face 801 that is assumed at the position on the upper end side of the detection region 1082. Thus, if the detection region 1082 in the lowermost row is moved upward so as to be aligned with the lower side of the detection target range, a face smaller than the face 801 having the minimum face size at the time of setting the size of the detection region 1082 may be included in the detection region 1082. In this case, if a face smaller than the face 801 is detected in the detection region 1082, the accuracy may decrease.

On the other hand, at the time of arranging detection regions in the x-axis direction within the detection target range, the number of detection regions is calculated based on the horizontal width (w) of the detection target range as in equation (1) given above, the detection regions at both ends in the lowermost row are positioned at both ends of the detection target range, and the remaining detection regions are arranged at equal intervals to adjust the positions.

Thus, as illustrated in FIG. 12A, a certain amount of margin may be produced in an overlapping range width 1003 in the x-axis direction with respect to the horizontal width of the face 503 having the maximum face size that may be included in the detection region 1082 in the lowermost row. In other words, a reducible margin may be produced in each detection region 1082 in the lowermost row.

Thus, the region setting unit 204 reduces the size of the detection region (face) within a range satisfying the conditions of the width of the overlapping range according to the detection target size (face size) and the detection region size described above. In this case, the region setting unit 204 reduces each detection region while maintaining the condition that the width of the overlapping range of each detection region in the lowermost row is not less than the horizontal width of the face 503 having the maximum face size at the position of the lowermost row so that the detection region falls within the detection target range.

Figure 12B:
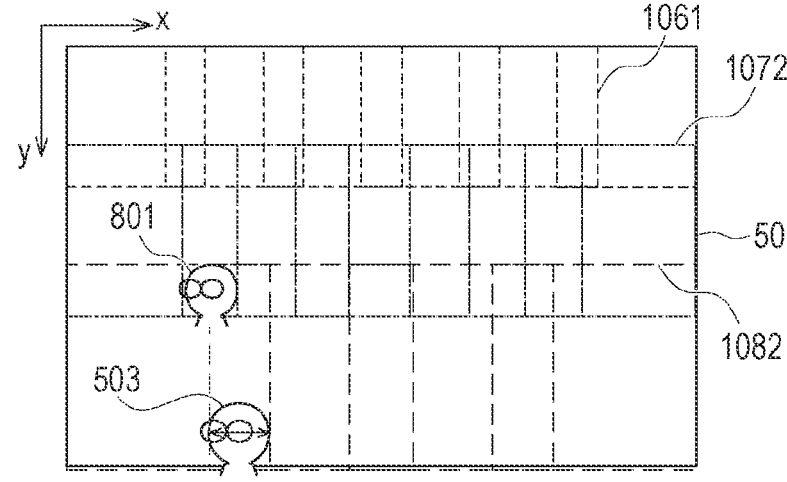

FIG. 12B is a diagram illustrating a state in which the detection regions 1082 in the third row, which is the lowermost row, have been reduced while the overlapping range width corresponding to the face size at the position of the lowermost end of the detection target range is maintained. Here, the detection regions 1082 in the lowermost row in FIG. 12B are smaller than the detection regions 1082 in the lowermost row in FIG. 12A, and thus the size of a face accurately detectable in the detection regions is small accordingly. Thus, it is possible to accurately detect a face smaller than the face 801. Even when the detection regions 1082 are moved upward so that the lower sides of the detection regions 1082 are aligned with the lower side of the detection target range, detection accuracy does not decrease. However, in the case of moving the detection regions in the lowermost row upward, it is necessary to satisfy a condition that the detection regions are moved upward only to positions where the lowermost row of the detection target range is included in the detection regions and the size of a face included in each detection region is larger than or equal to ¼ of the size of the detection region. Because of this condition, a situation may occur where it is not possible to move upward all of the detection regions in the lowermost row to positions where the detection regions are aligned with the lower side of the detection target range. In this case, as will be described in a modification below, the entirety of the detection regions may be included in the detection target range by moving them upward while increasing the number of detection regions or allowing the size of a face included therein to be smaller than or equal to ¼ of the detection region size.

Figure 12C:
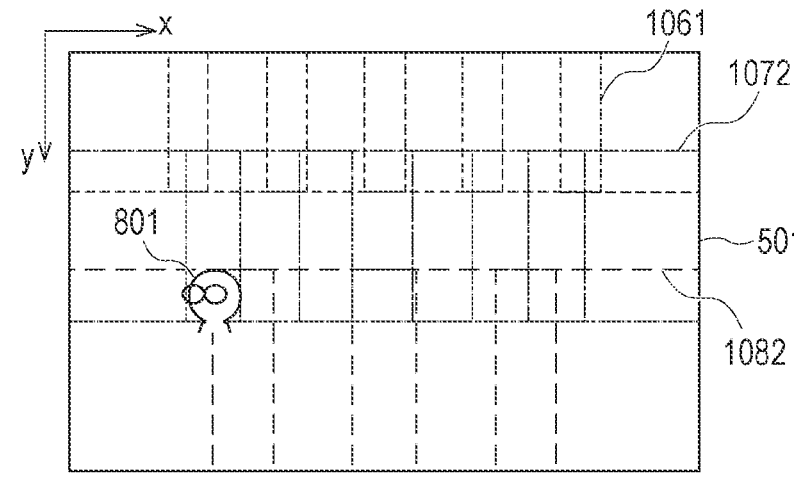

FIG. 12C is a diagram illustrating a state after the detection regions in the lowermost row (third row) have been moved upward so as to be aligned with the lower side of the detection target range.

The region setting unit 204 performs the above-described adjustment processing on the detection regions, thereby causing all the detection regions to fall within the detection target range. Thereafter, the region setting unit 204 ends the process of the flowchart in FIG. 5.

After performing adjustment to move the detection regions in the lowermost row upward so that the detection regions are aligned with the lower side of the detection target range in the above-described manner, the region setting unit 204 may perform, on the detection regions in the second row and the first row, adjustment of reducing the detection regions or moving the detection regions upward similarly to the adjustment processing performed in the third row. That is, when the reduction processing similar to that in the third row is performed on the detection regions in the second row or the first row, the sizes of the detection regions after the reduction processing are smaller than the minimum face size assumed when the detection regions are set in the S432. Thus, the detection accuracy for the minimum face size assumed in S432 increases. In the present embodiment, in the case of reducing the detection regions or moving the detection regions upward, the reduction or the upward movement is performed from the detection regions in the lowermost row that does not have a lower row and does not have necessity to consider an overlapping range. However, the reduction or the upward movement may be performed from any row. In this case, however, the width of the overlapping range with respect to the detection region in the lower row needs to cover the face size assumed at the position. To satisfy the condition of the width of the overlapping range, it is desired to perform adjustment such that the detection regions in the lower row are reduced and moved upward.

As described above, the information processing apparatus 100 according to the first embodiment sets the sizes of detection regions and overlapping ranges between adjacent detection regions, based on the detection target sizes (face sizes) assumed at individual positions in a captured image (detection target range). Accordingly, erroneous detection, undetected state, and the like are less likely to occur. As a result, it is possible to finally output an appropriate detection result in object detection in the plurality of detection regions and the processing of integrating detection results. That is, according to the present embodiment, in the case of detecting an object as a detection target from a captured image, it is possible to reduce erroneous detection, undetected state, and the like while suppressing an increase in the processing load of detecting the detection target from the image.

Modification 1

Figure 5:
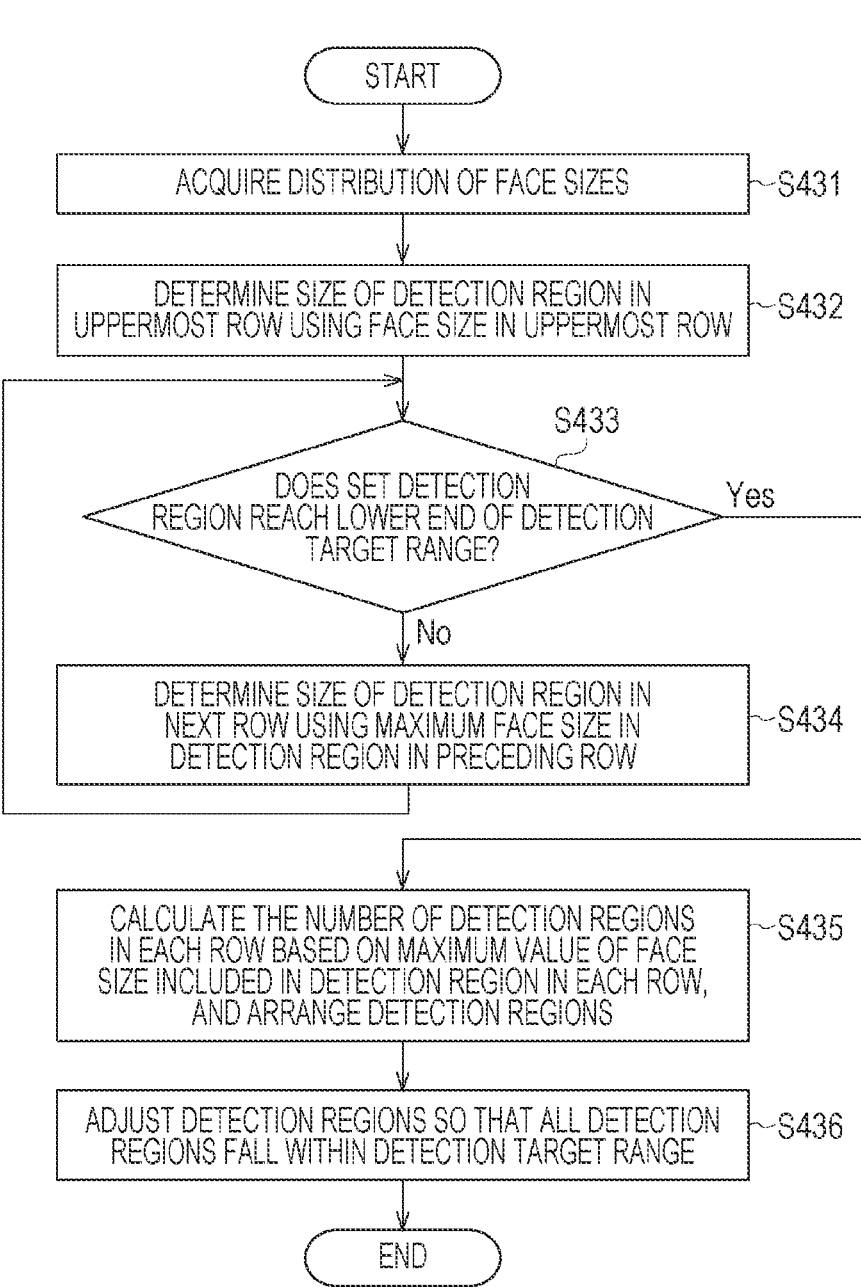
FIG. 5 is a flowchart of detection region setting processing.

In the detection region adjustment processing in S436 in the flowchart of FIG. 5 described above, the detection regions are adjusted while the number of detection regions calculated in S435 is maintained. Alternatively, for example, the number of detection regions may be increased because the sizes of detection regions can be reduced by increasing the number of detection regions. That is, the region setting unit 204 may increase the number of detection regions and reduce the sizes of the detection regions within a range satisfying the condition of the width of an overlapping range according to the size of a detection target (face), the condition of the sizes of detection regions, and the condition of the upper limit of the number of detection regions. However, an increase in the number of detection regions increases the processing time. Thus, the number of detection regions is increased within a range of allowable processing time. Also in this example, the upper limit of the number of detection regions is set by the upper limit setting unit 208.

In the first embodiment, an example is described in which the face size depends only on the y coordinate. Thus, for example, in the case of increasing the number of detection regions, it is efficient from the viewpoint of detection accuracy to increase the number of detection regions in the row in which the ratio between the size of a detection region and a minimum face size assumed in the detection region is the smallest. However, the sizes of detection regions are reduced in the row in which the number of detection regions is increased. To maintain the widths of overlapping ranges set on the upper side and the lower side of the detection regions, it is necessary to move upward the detection regions below the row. Thus, it is necessary to pay attention to whether a condition that all the detection regions are within the detection target range is satisfied. That is, if the condition that all the detection regions are within the detection target range is not satisfied, detection regions may be added in a row below the original lowermost row if an increase in processing time is allowed. At this time, the sizes of the detection regions to be added in the lower row are larger than the sizes of the detection regions in the original lowermost row. Thus, the number of detection regions to be added is smaller than or equal to the number of detection regions in the original lowermost row.

Modification 2

In the above-described embodiment, in the processing of setting detection regions, a larger number of detection regions are necessary when a face size in a captured image is small or when the change in face size in the y-axis direction is large. However, because the processing time increases as the number of detection regions increases, a predetermined warning may be provided if the number of detection regions obtained in the detection region setting processing in the flowchart of FIG. 5 exceeds the upper limit of the number of detection regions calculated from an allowable processing time. That is, in this case, the region setting unit 204 outputs predetermined warning information if the number of detection regions exceeds the upper limit at the time of setting detection regions to be included in the detection target range so as to satisfy the condition of the width of an overlapping range according to the size of a detection target (face) and the condition of the sizes of the detection regions. The warning information may be information for displaying a warning on the display unit 104, or information for outputting a warning sound from a speaker or the like (not illustrated).

If the number of detection regions calculated from the allowable processing time exceeds the upper limit, the number of necessary detection regions may be reduced by, for example, making the width of an overlapping range smaller than the unity magnification of the face size or increasing the size of a detection region with respect to the minimum face size. However, there is a trade-off between the detection accuracy and the number of detection regions. Thus, if the relationship between the sizes of detection regions and the detection accuracy and the relationship between the width of an overlapping range and the detection accuracy are known, the condition of an overlapping range or the condition of the sizes of detection regions may be relaxed when the number of detection regions exceeds the upper limit. That is, if the number of detection regions exceeds the upper limit at the time of setting detection regions so as to be included in the detection target range while satisfying the conditions of the width of an overlapping range and the sizes of detection regions in accordance with a detection target size, the region setting unit 204 relaxes the conditions of the width of an overlapping range and the sizes of detection regions. In this case, the arrangement of detection regions with the highest accuracy may be automatically reset within a range in which the number of detection regions is within the upper limit. Alternatively, at the time of providing a warning as described above, a GUI or the like may be displayed to allow the user to select whether to reset the arrangement of detection regions. Furthermore, the ratio between the width of an overlapping range and a face size and the ratio between the minimum face size and the size of a detection region may be designated by the user, and detection regions may be reset using the ratios designated by the user.

Modification 3

In the above-described embodiment, the size of a detection region is determined in accordance with a face size assumed at the position where the detection region is set. Thus, when the face size assumed at the position where the detection region is set is small, the detection region is small. On the other hand, the size of the image to be input to the detection unit 202 is determined by the learning model. Thus, when the size of the detection region is smaller than the size of the image to be input to the detection unit 202, the detection region needs to be enlarged and input. In this case, if the enlargement ratio is too large, that is, if the detection region is enlarged too much, the face in the detection region image becomes unclear, and thus the detection accuracy may decrease. Thus, the range setting unit 207 may set a detection target range, based on the detection target sizes assumed at individual positions. That is, the range setting unit 207 sets, as a detection target range, a range in which the face size is larger than or equal to a predetermined minimum value, based on a distribution of face sizes acquired by the size acquisition unit 203. As a result of setting the detection target range in this manner, the detection regions set within the detection target range by the region setting unit 204 are detection regions in which the face size is larger than or equal to the predetermined minimum value. As a result, the detection accuracy of the detection unit 202 is maintained. The predetermined minimum value of the face size may be set by the user, or may be a value calculated from the relationship between the enlargement ratio and the detection accuracy according to the learning model used in the detection unit 202, and the minimum face size accurately detectable in the learning model.

Second Embodiment

In the first embodiment, a face size depends only on the y coordinate. Thus, detection region sizes in individual rows and overlapping ranges in the y-axis direction are determined, and then an overlapping range width in the x-axis direction and the number of detection regions are determined. However, the present invention is not limited thereto. Detection regions can be set, for example, even when the face size in a captured image depends on the x coordinate. That is, even when the face size in a captured image depends on the x coordinate, detection regions may be set so as to cover the entire detection target range and include faces finally assumed at individual positions in the detection target range. When the face size in a captured image depends on the x coordinate, for example, detection regions may be allocated in order from a position having the smallest face size in a region in which no detection region has been set. Furthermore, detection regions can be set not only when the face size depends on only either of the y coordinate and the x coordinate, but also when the face size depends on both the y coordinate and the x coordinate.

In the second embodiment, a description will be given of an example of setting detection regions in a case where the face size depends on not only the y coordinate but also the x coordinate. The configuration of the information processing apparatus 100 according to the second embodiment is similar to that illustrated in FIG. 1 and FIG. 2 described above, and thus the illustration and description thereof are be omitted. In the second embodiment, the size acquisition unit 203 acquires a distribution of detection target sizes (face sizes) at individual positions in both the x-axis direction and the y-axis direction of an image. The region setting unit 204 according to the second embodiment sets the sizes of detection regions at individual positions and overlapping ranges between adjacent detection regions, based on the distribution of detection target sizes at individual positions in both the x-axis direction and the y-axis direction.

FIG. 13 to FIG. 18 are diagrams for describing an example of setting detection regions in a case where the face size depends on not only the y coordinate but also the x coordinate. Also in the description of the second embodiment, the detection target range is, for example, the entire area of the captured image 501 as in the above. To make the description easy to understand, it is assumed that the face size increases in the positive direction in the y-axis direction and the x-axis direction, and the position at which the face size is the smallest is the position of the coordinates (x, y)=(0, 0) at the upper left end of the captured image 501.

First, the region setting unit 204 sets the entire detection target range as an unset region in which no detection region has been set. In the present embodiment, the region setting unit 204 sets a detection region at the upper left end of the unset region, and repeats processing of updating a setting-completed region, which will be described below, to set detection regions over the entire detection target range.

Figure 13:
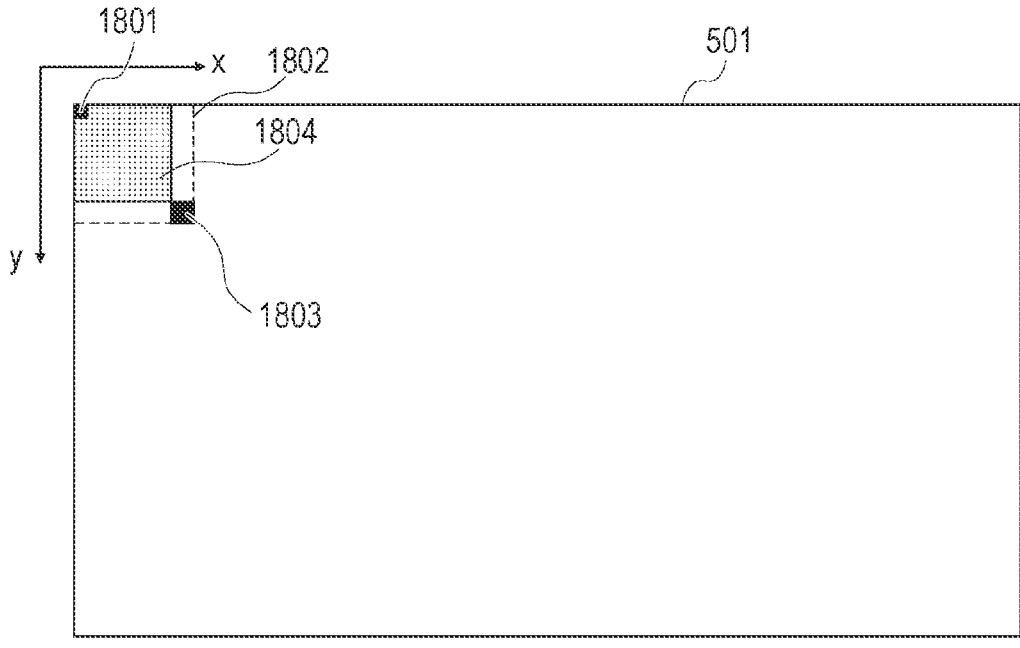
FIG. 13 is an explanatory diagram of setting of a first detection region according to a second embodiment.

FIG. 13 is an explanatory diagram of an example of setting a first detection region at the upper left end of an unset region, and setting a setting-completed region in the detection region. At this point of time, the entire captured image 501 (the entire detection target range) is an unset region. Thus, the region setting unit 204 sets a detection region 1802 at the upper left end of the captured image 501, which is the upper left end of the unset region. The size of the detection region is set such that a face size 1801 assumed at the position of the upper left end of the unset region is a minimum face size that does not cause a decrease in detection accuracy. In the first embodiment, a minimum face size that does not cause a decrease in detection accuracy is ¼ of the size of the detection region. In the second embodiment, a description will be given under the assumption that detection accuracy does not decrease as long as the face size is ⅛ or more of the size of the detection region. That is, in this example, the region setting unit 204 sets the detection region 1802 having a size that is eight times the minimum face size that does not cause a decrease in detection accuracy.

Furthermore, the region setting unit 204 sets, along the right side and the lower side of the first detection region 1802, respective overlapping ranges that overlap adjacent detection regions set later. The width of each overlapping range corresponds to a face size 1803 assumed at the position of the lower right end of the detection region 1802. In the present embodiment, it is assumed that the face size increases in the positive direction of the y axis and the x axis, and thus the face size 1803 at the lower right end of the detection region 1802 is a maximum face size assumed in the detection region 1802. Thus, the region setting unit 204 sets the width of each of the overlapping ranges set along the right side and the lower side of the detection region 1802 to the width corresponding to the face size 1803. In addition, the region setting unit 204 sets, of the detection region 1802, the region other than the overlapping ranges as a setting-completed region 1804. Of the detection region 1802, the region other than the setting-completed region 1804 is an unset region at this point of time.

Subsequently, the region setting unit 204 sets a second detection region along the lower side of the first detection region 1802. The region setting unit 204 sets the second detection region at the unset region other than the setting-completed region 1804 of the first detection region 1802 that has been set.

Figure 14:
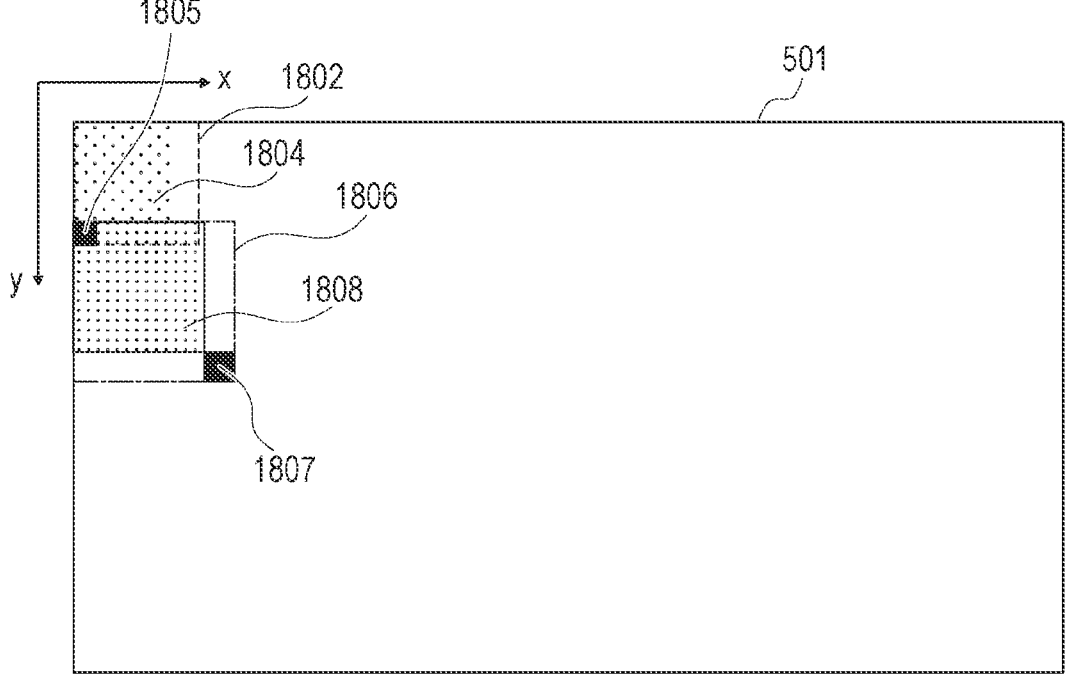
FIG. 14 is an explanatory diagram of setting of a detection region subsequent to the detection region in the example in FIG. 13.

FIG. 14 is a diagram for describing a state of setting a second detection region at the unset region along the lower side of the first detection region 1802. The region setting unit 204 sets a second detection region 1806 at the unset region along the lower side of the first detection region 1802, specifically, at the upper left end of the unset region along the lower side of the setting-completed region 1804. In the case of setting the second detection region 1806, similarly to the case of setting the first detection region described above, the size of the detection region 1806 is set to eight times a face size 1805 assumed at the position of the upper left end of the unset region. As for the overlapping ranges of the detection region 1806, similarly to the case of the first detection region, the overlapping ranges are set along the right side and the lower side of the detection region 1806, and the width of each overlapping range is the width corresponding to a face size 1807 assumed at the position of the lower right end of the detection region 1806. In addition, the region setting unit 204 sets, of the detection region 1806, the region other than the overlapping ranges as a setting-completed region 1808. Of the detection region 1806, the region other than the setting-completed region 1808 is an unset region at this point of time.

Figure 15:
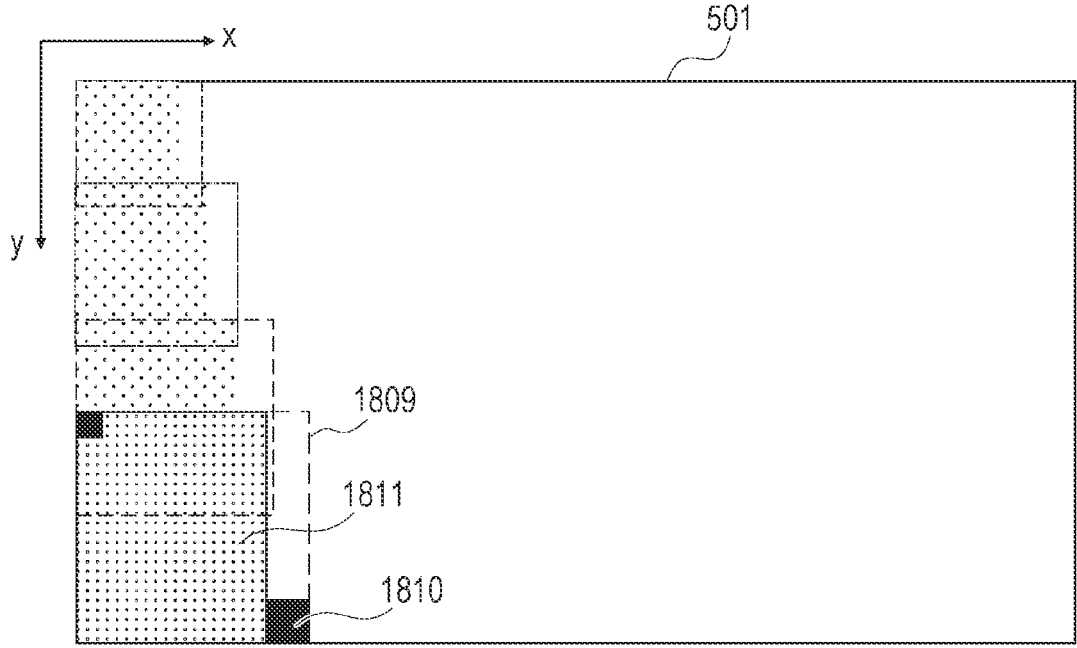
FIG. 15 is an explanatory diagram of setting of a detection region at a lower side of a detection target range according to the second embodiment.

FIG. 15 is a diagram illustrating a state of sequentially setting detection regions each adjacent to the lower side of a set detection region in the above-described manner, and determining setting-completed regions for the respective detection regions. If a detection region extends off the lower side of the detection target range as a result of sequentially setting detection regions in the above-described manner, the region setting unit 204 arranges the detection region extending off the lower side of the detection target range so as to be within the detection target range. A detection region 1809 in FIG. 15 is a detection region arranged so as to be within the detection target range. At this time, the region setting unit 204 does not provide an overlapping range along the lower side of the detection region 1809 arranged within the detection target range, and provides an overlapping range only along the right side thereof. The width of the overlapping range provided along the right side of the detection region 1809 is the width corresponding to the face size 1810 assumed at the position of the lower right end of the detection region 1809. The region setting unit 204 sets, of the detection region 1809, the region other than the overlapping range as a setting-completed region 1811. Of the detection region 1809, the region other than the setting-completed region 1811 is an unset region at this point of time.

After setting the setting-completed region 1811 in a lower side portion of the detection target range in the above-described manner, the region setting unit 204 sets the position for setting the next detection region to the right side of the first detection region 1802 described above.

Figure 16:
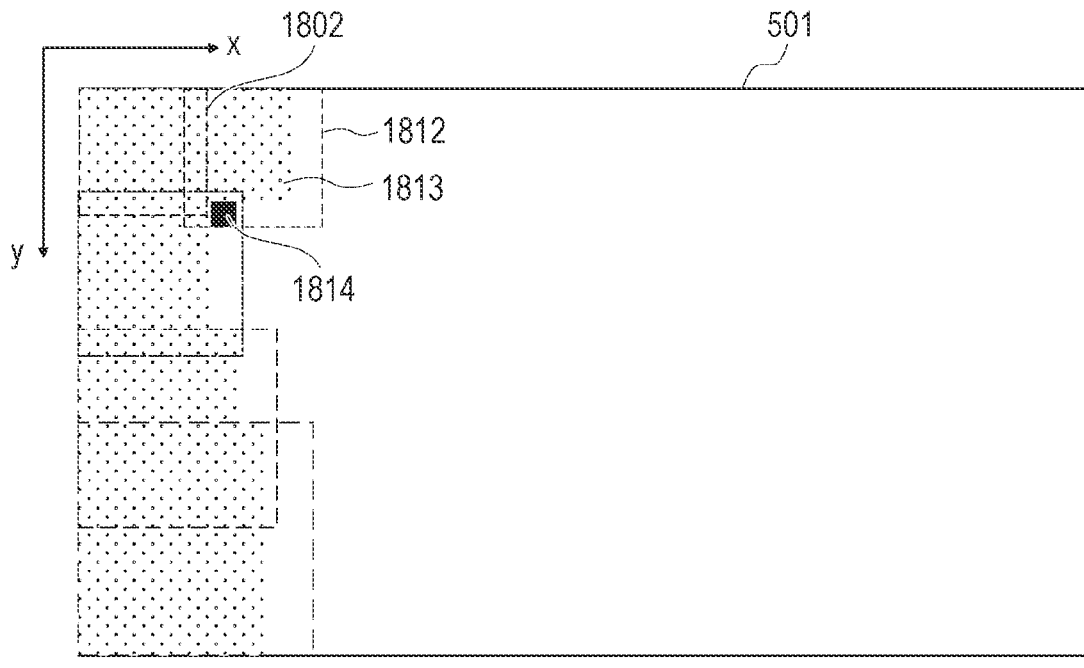
FIG. 16 is an explanatory diagram of setting of a next detection region at an upper side of the detection target range according to the second embodiment.

FIG. 16 is a diagram for describing a state of setting the next detection region along the right side of the first detection region 1802. As illustrated in FIG. 16, the region setting unit 204 sets a next detection region 1812 along the right side of the first detection region 1802. At this time, the region setting unit 204 sets the detection region 1812 such that the detection region 1812 overlaps the first detection region 1802 by the overlapping range set along the right side of the detection region 1802. Furthermore, the region setting unit 204 sets, along the right side and the lower side of the detection region 1812, respective overlapping ranges that overlap adjacent detection regions set later. The width of each overlapping range corresponds to a face size assumed at the position of the lower right end of the detection region 1812. The region setting unit 204 sets, of the detection region 1812, the region other than the overlapping ranges as a setting-completed region 1813. Of the detection region 1812, the region other than the setting-completed region 1813 and a setting-completed region that has been set is an unset region at this point of time.

After setting the detection region 1812, the region setting unit 204 sets the next detection region along the lower side of the setting-completed region 1813 in the detection region 1812.

Figure 17:
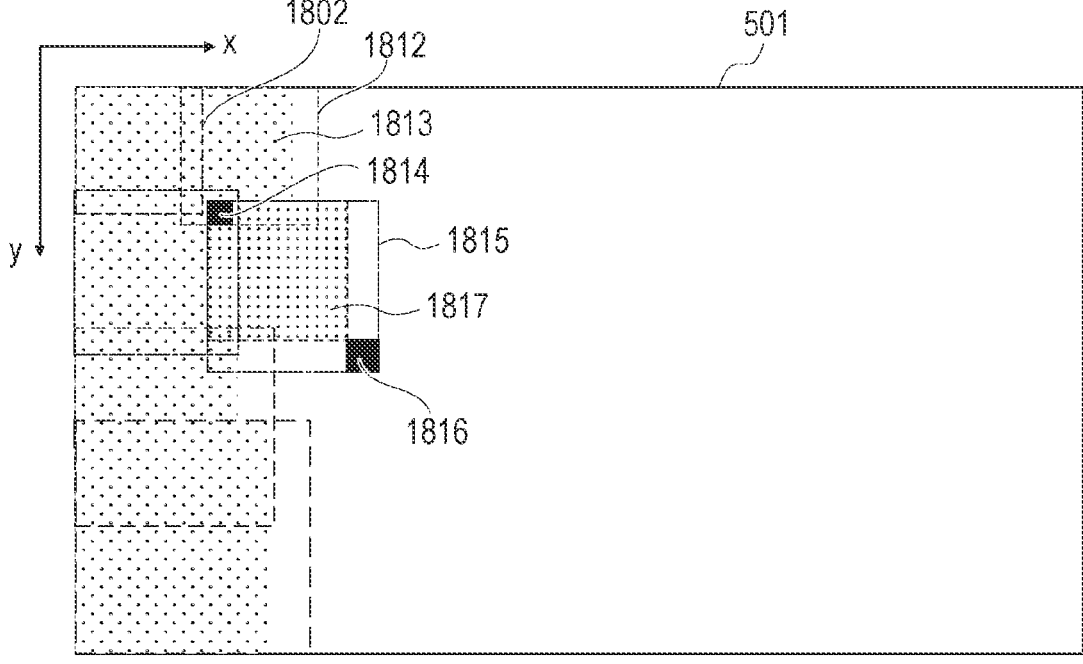
FIG. 17 is an explanatory diagram of setting of a detection region subsequent to the detection region in the example in FIG. 16.

FIG. 17 is a diagram for describing a state of setting a detection region 1815 along the lower side of the setting-completed region 1813. At this time, the region setting unit 204 sets the detection region 1815, based on the position of the upper left end of the unset region along the lower side of the setting-completed region 1813 illustrated in FIG. 16 and a face size 1814 at the position. That is, the region setting unit 204 sets the size of the detection region 1815 to be eight times the face size 1814. Furthermore, the region setting unit 204 sets, along the right side and the lower side of the detection region 1815, respective overlapping ranges that overlap adjacent detection regions set later. The width of each overlapping range corresponds to a face size 1816 assumed at the position of the lower right end of the detection region 1815. The region setting unit 204 sets, of the detection region 1815, the region other than the overlapping ranges as a setting-completed region 1817. Of the detection region 1815, the region other than the setting-completed region 1817 and a setting-completed region that has been set is an unset region at this point of time.

The region setting unit 204 repeats the above-described processing, thereby arranging all detection regions so as to cover the detection target range.

Figure 18:
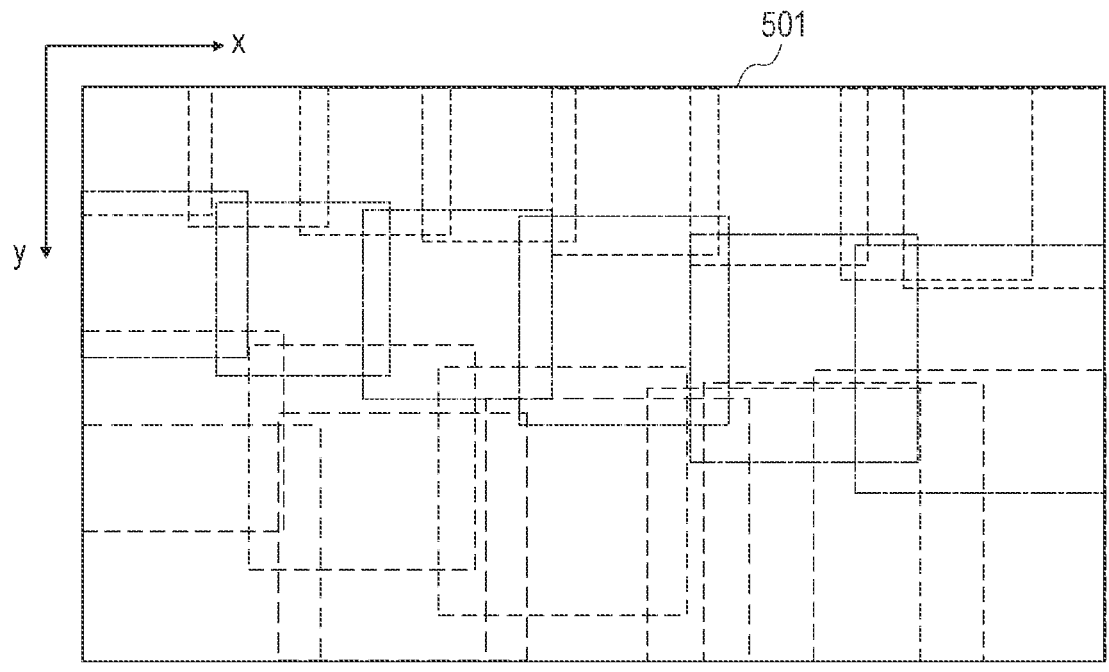
FIG. 18 is an explanatory diagram of all detection regions in the detection target range according to the second embodiment.

FIG. 18 is a diagram illustrating an arrangement example in which detection regions have been arranged so as to cover the entire detection target range and the entire detection target range has become a setting-completed region. When the detection regions have been arranged so as to cover the entire detection target range, the region setting unit 204 determines that setting of all the detection regions has been completed.

With the above-described processing, the information processing apparatus according to the present embodiment is capable of setting the sizes of detection regions and overlapping ranges between adjacent detection regions, and setting detection regions that cover the entire detection target range, even when the face size depends on not only the y coordinate but also the x coordinate.

Third Embodiment

Next, the information processing apparatus 100 according to a third embodiment will be described. The configuration of the information processing apparatus 100 according to the third embodiment is similar to that illustrated in FIG. 1 and FIG. 2 described above, and thus the illustration and description thereof will be omitted. In the third embodiment, a description will be given of an example in which the face size depends only on the y coordinate, and there is no substantial decrease in detection accuracy when the horizontal width of the face size is larger than or equal to ¼ of the size of a detection region, as in the foregoing first embodiment.

Figure 19:
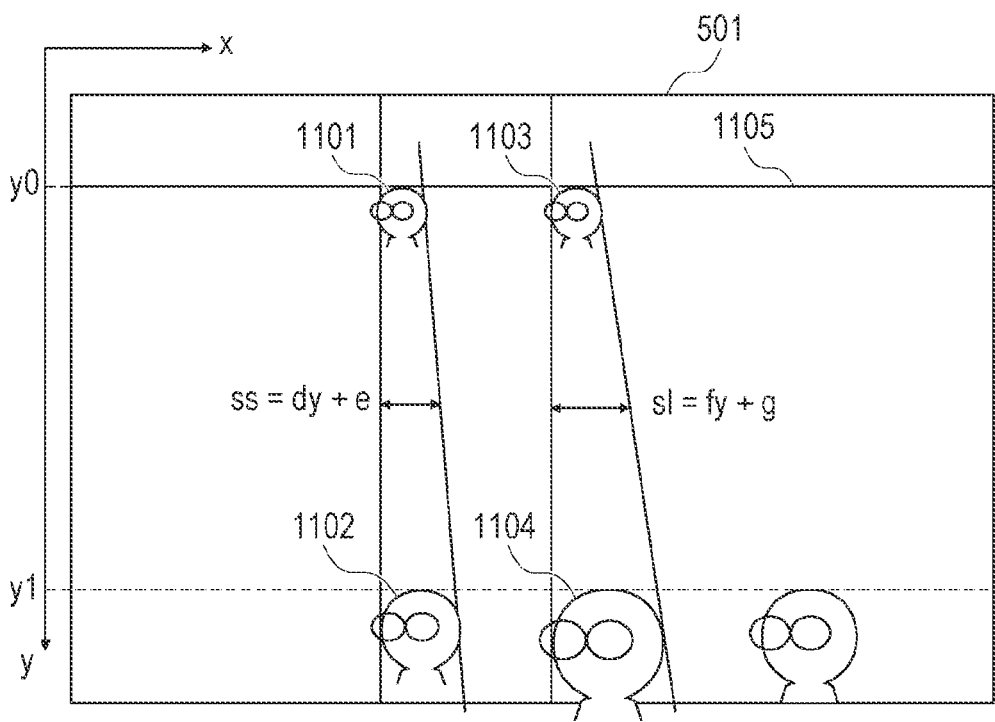
FIG. 19 is a diagram illustrating an example of face sizes and a distribution thereof according to a third embodiment.

In the first embodiment described above, an example has been given in which the face size s is expressed by s=by+c and has a value uniquely determined with respect to the y coordinate. For example, when the depression angle of the image capturing apparatus is shallow, the face size may have a distribution of being largely different at the same y coordinate, as illustrated in FIG. 19. FIG. 19 illustrates an example in which a face 1101 has a minimum face size assumed at the position of y=y0, a face 1102 has a smallest face size assumed at the position of y=y1, a face 1103 has a maximum face size assumed at the position of y=y0, and a face 1104 has a maximum face size assumed at the position of y=y1.

In the third embodiment, the size acquisition unit 203 acquires a maximum size (maximum face size) and a minimum size (minimum face size) of a detection target (face) assumed at the same position having the same y coordinate. In the third embodiment, the face size depends only on the y coordinate, and thus a minimum size ss, which is the minimum value of the face size, can be expressed by ss=dy+e, and a maximum size sl, which is the maximum value of the face size, can be expressed by sl=fy+g, which are assumed at the position of the same y coordinate.

Thus, the region setting unit 204 according to the third embodiment sets the sizes of detection regions and overlapping ranges between adjacent detection regions, based on the minimum sizes and the maximum sizes of detection targets (faces) at individual positions acquired by the size acquisition unit 203.

In the third embodiment, a method of setting detection regions will be described with reference to the flowchart in FIG. 5 used in the first embodiment. When the depression angle of the image capturing apparatus is shallow, no face appears in the vicinity of the upper side of the captured image 501 in many cases. Thus, in the third embodiment, a region in which the y coordinate is larger than or equal to y0 (y≥y0) is regarded as a detection target range 1105, as illustrated in FIG. 19.

In the third embodiment, the distribution of face sizes acquired by the region setting unit 204 from the size acquisition unit 203 in S431 in the flowchart of FIG. 5 is a distribution of face sizes in the detection target range 1105 of y≥y0 (the y coordinate is y0 or more) as illustrated in FIG. 19. In the third embodiment, as described above, the minimum size of a face assumed at each position in the captured image 501 is expressed by ss=dy+e and the maximum size of a face is expressed by sl=fy+g, which depend only on the y coordinate.

Hereinafter, a smallest face having the minimum size ss at each position will be referred to as a "minimum face", and a largest face having the maximum size sl at each position will be referred to as a "maximum face". In the third embodiment, the face size has an aspect ratio of 1. That is, the vertical width of a face at each position is equal to the face size, which is the horizontal width of the face.

Also in an example in the third embodiment, when the user sets a face size at a certain position, the user may drag the face 502 or the face 503 to a certain position by using the input unit 105 and change the position and size of the face, or may input numerical values indicating the position and size. In the third embodiment, such setting input is performed for the maximum face and the minimum face.

Subsequently, in S432, the region setting unit 204 determines the size of a detection region in the uppermost row (first row), based on the minimum face in the detection target range 1105, that is, the minimum face 1101 at the position y=0. As described above, the detection accuracy of the detection unit 202 is correlated with a face size in a detection region image. If there is no substantial decrease in detection accuracy when the horizontal width of the face size is larger than or equal to ¼ of the detection region size, the region setting unit 204 sets the detection region size to four times the size of the minimum face.

Figure 20:
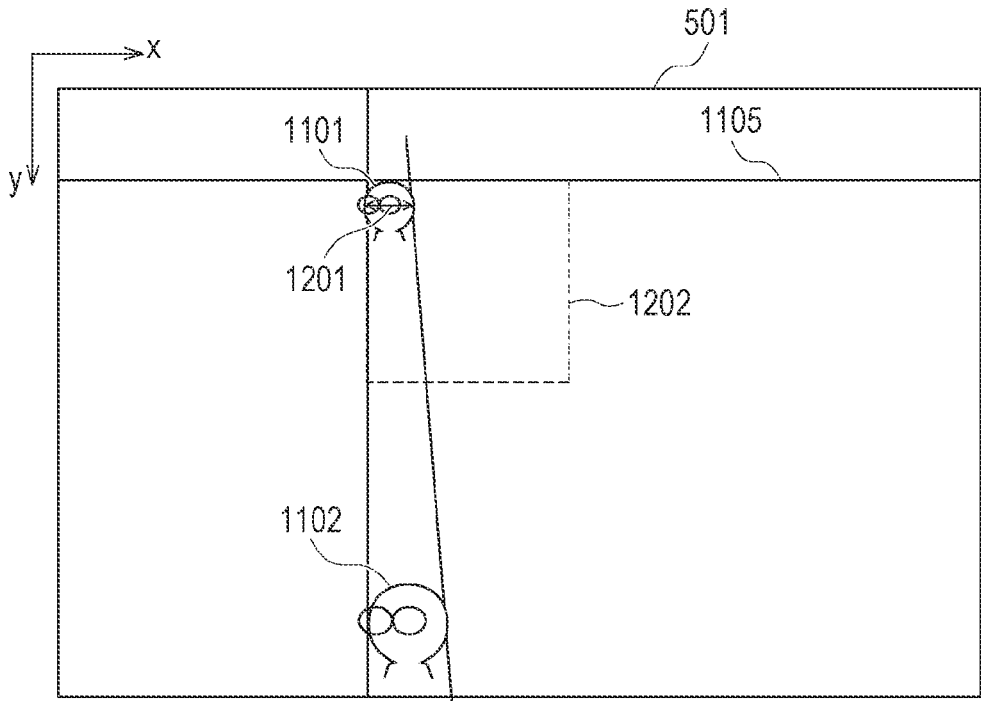
FIG. 20 is an explanatory diagram of an example of setting of a detection region in a first row according to the third embodiment.

FIG. 20 is a diagram illustrating a state in which a detection region having a size four times the minimum face in the uppermost row of the detection target range 1105 has been set in the uppermost row. That is, the region setting unit 204 sets, based on a width 1201 of the minimum face 1101 at y=y0, a region having a size four times the size of the minimum face 1101 as a detection region 1202 in the uppermost row.

Subsequently, in S433, the region setting unit 204 determines whether the detection region set in the above-described manner reaches the lower end of the detection target range 1105. At the point of time illustrated in FIG. 20, only the detection region in the first row is set. Thus, the region setting unit 204 determines that the detection region does not reach the lower end of the detection target range, and proceeds to S434.

In S434, the region setting unit 204 sets a detection region in the second row. At this time, the region setting unit 204 sets, as a detection region in the second row, a region that has an upper end corresponding to the top portion of the maximum face located at the lowermost end of the detection region in the first row and that has a size in which the minimum face located at the same position as the maximum face in the y coordinate has a minimum face size of being accurately detected.

Figure 21:
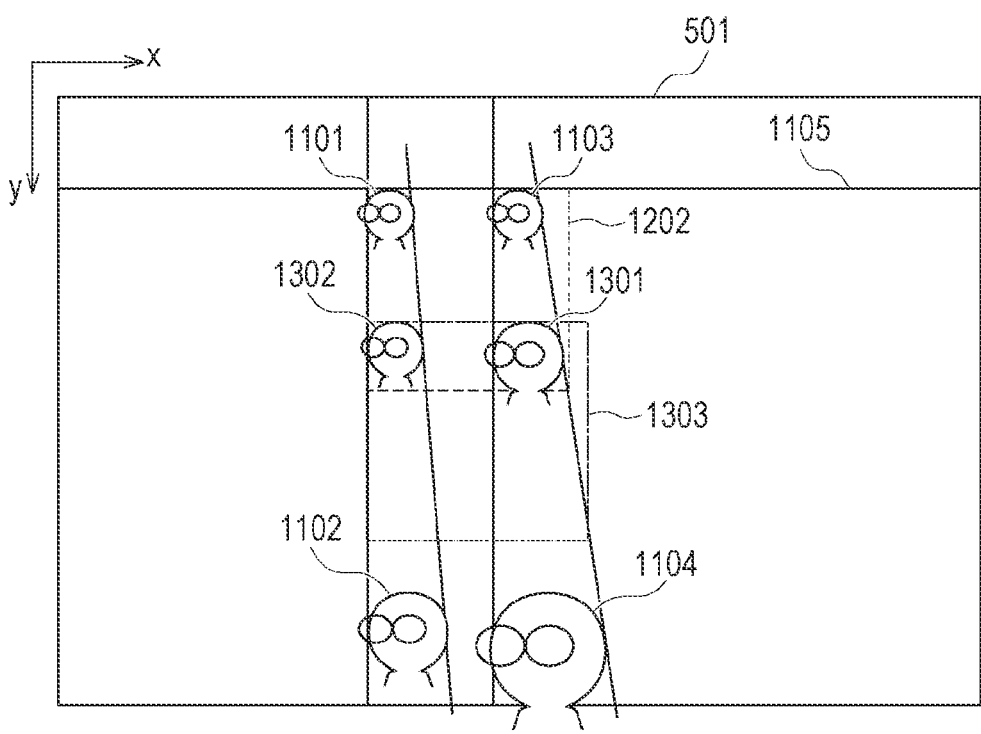
FIG. 21 is an explanatory diagram of a detection region and an overlapping range in a second row according to the third embodiment.

FIG. 21 is a diagram illustrating a state in which a detection region in the second row has been set. The region setting unit 204 sets a detection region 1303 that has a size four times the size of a minimum face 1302 whose upper end is located at the same position in the y coordinate as the top portion of a maximum face 1301 located at the lowermost end of the detection region 1202 in the first row set in S432 and that has an upper end corresponding to the top portion of the minimum face 1302. Thereafter, the region setting unit 204 returns the process to S433. At the point of time illustrated in FIG. 21, similarly to the above, the detection region in the second row does not reach the lower end of the detection target range 1105, and thus the region setting unit 204 proceeds from S433 to S434 again.

Figure 22:
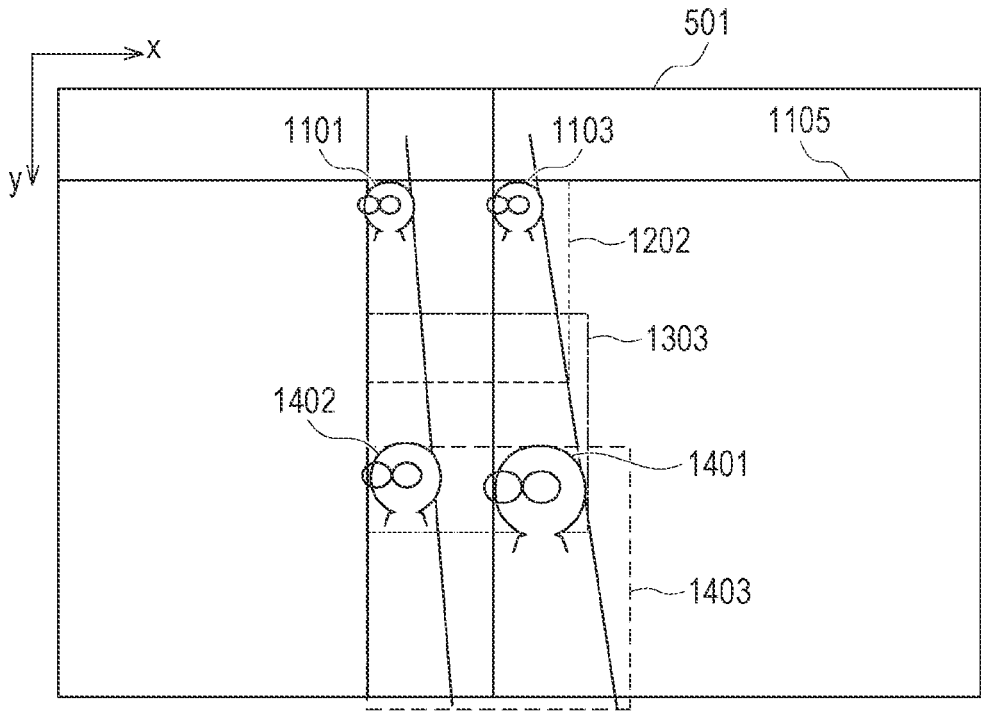
FIG. 22 is an explanatory diagram of a detection region and an overlapping range in a third row according to the third embodiment.

FIG. 22 is a diagram illustrating a state in which a detection region in the third row has been set. In the case of setting a detection region in the third row, the region setting unit 204 sets a detection region 1403 such that the upper end thereof aligns with the top portion of a minimum face 1402. The detection region 1403 has a size four times the size of the minimum face 1402 whose upper end is aligned with the top portion of a maximum face 1401 located at the lowermost end of the detection region 1303 in the second row. After setting the detection region in this manner, the region setting unit 204 proceeds to S433 again. In this case, the detection region in the third row reaches the lower end of the detection target range 1105, and thus the region setting unit 204 proceeds from S433 to S435.

In S435, the region setting unit 204 calculates the width of an overlapping range in the x-axis direction, based on the size of the maximum face included in the detection region in each row, and further calculates the number of detection regions in the x-axis direction in each row.

Hereinafter, a description will be given of a state of calculating the number of detection regions in the x-axis direction (horizontal direction) in each row, and arranging detection regions of the number in the x-axis direction, with reference to FIGS. 23A to 23C.

Figure 23A:
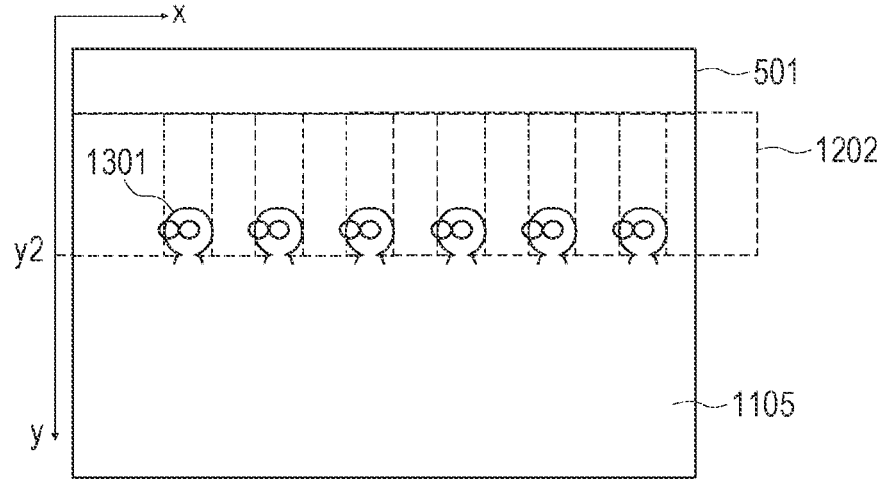
FIGS. 23A, 23B, and 23C are explanatory diagrams of the numbers of detection regions and overlapping ranges in individual rows according to the third embodiment.

FIG. 23A is a diagram illustrating an example of calculation of the number of detection regions and arrangement of detection regions in the first row.

Among the faces assumed to be included in the detection region 1202 in the first row, the maximum face is the maximum face 1301 at the lowermost end of the detection region 1202. Thus, the width of an overlapping range in the x-axis direction is the horizontal width of the maximum face 1301. As a result of setting the width of the overlapping range in this manner, the detection target range 1105 includes at least one detection region including a face included within the range of y≤y2.

At this time, the number n of detection regions in the first row is expressed by the following equation (2), where sl is the horizontal width (maximum size) of the maximum face 1301, w is the horizontal width of the captured image, and d is the size of the detection region. In the equation, ceil( ) is a ceiling function.

$$n = \mathrm{ceil}((w-sl)/(d-sl)) \qquad (2)$$

For the second and third rows, overlapping ranges and the numbers of detection regions are determined in a manner similar to that in the first row.

Figure 23B:
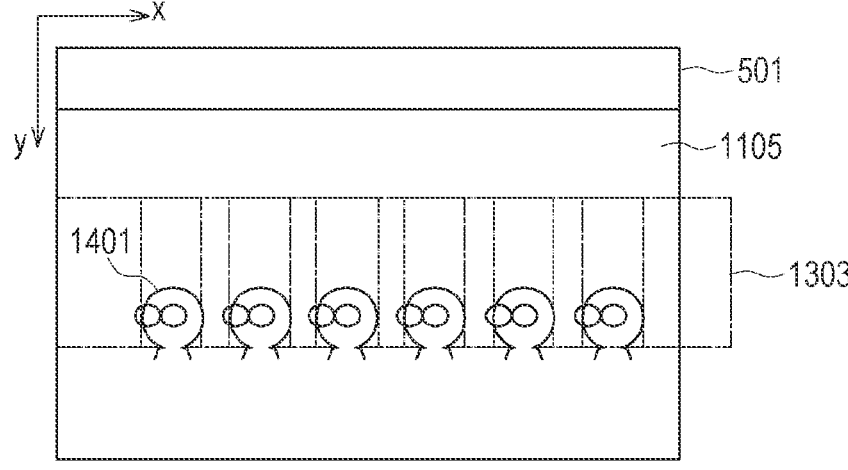
Figure 23C:
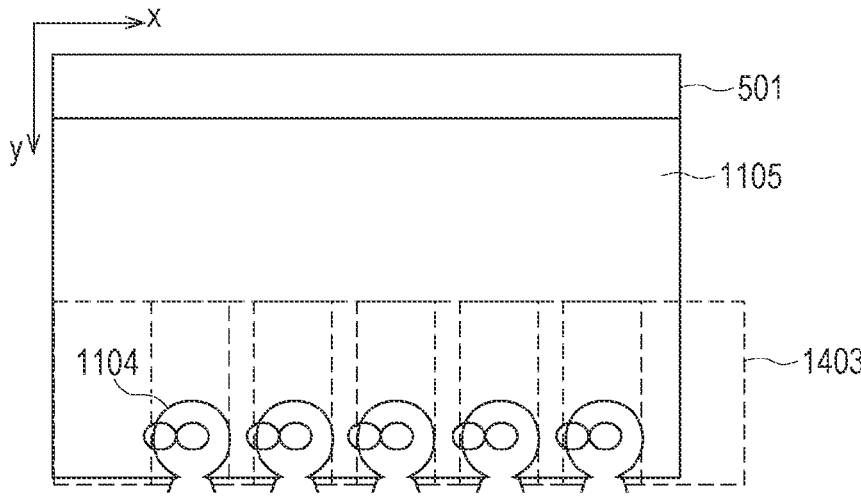

FIG. 23B is a diagram illustrating an example in which the overlapping ranges in the x-axis direction and the number of detection regions are determined in the second row, and detection regions 1303 of the number are arranged. FIG. 23C is a diagram illustrating an example in which the overlapping ranges in the x-axis direction and the number of detection regions are determined in the third row, and detection regions 1403 of the number are arranged. The horizontal width of the maximum face used to calculate the number of detection regions in the third row illustrated in FIG. 23C is not the size of the maximum face in the detection region in the third row, but is the size of the maximum face on the lower side of the detection target range 1105.

Figure 24:
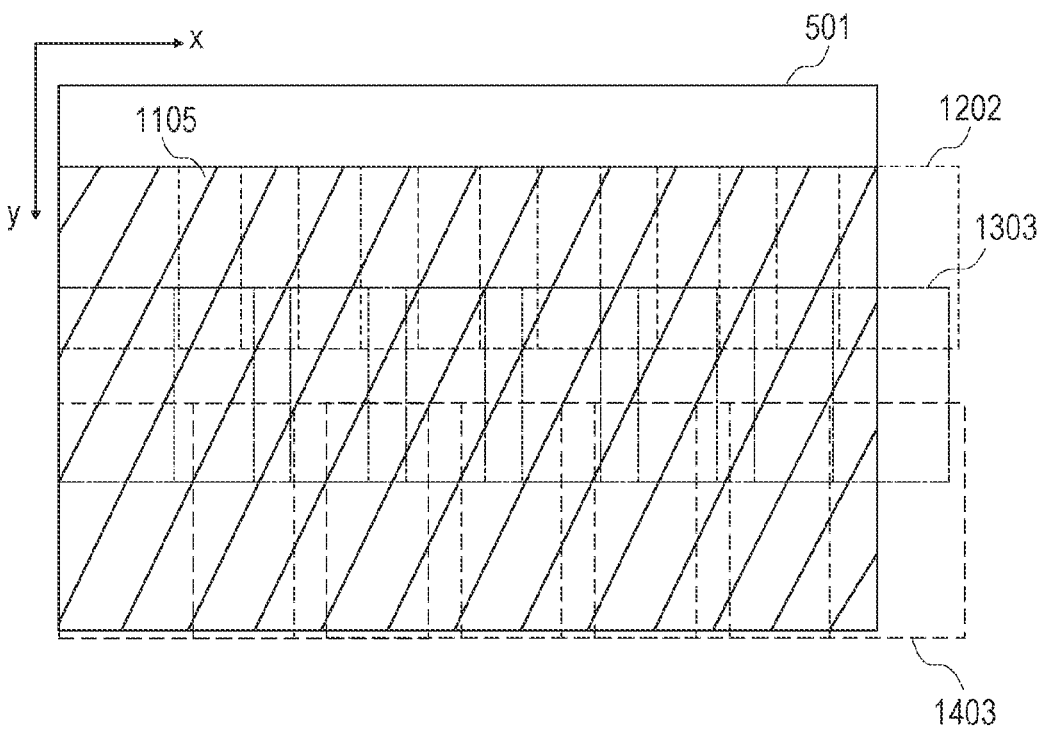
FIG. 24 is an explanatory diagram of an example of arrangement of all detection regions according to the third embodiment.

FIG. 24 is a diagram illustrating a state in which all the detection regions 1202, 1303, and 1403 of the number of detection regions determined for each of the first to third rows in the above-described manner are arranged in the detection target range 1105. After setting the detection regions to cover the entire area of the detection target range in the above-described manner, the region setting unit 204 adjusts, in S436, the detection regions so that all the detection regions 1202, 1303, and 1403 fall within the detection target range 1105. The processing of adjusting the detection regions is similar to the processing described in the first embodiment. That is, the region setting unit 204 arranges the detection regions such that the detection regions at both ends are located at both ends of the detection target range in each row, and then arranges the remaining detection regions at equal intervals.

Figure 25:
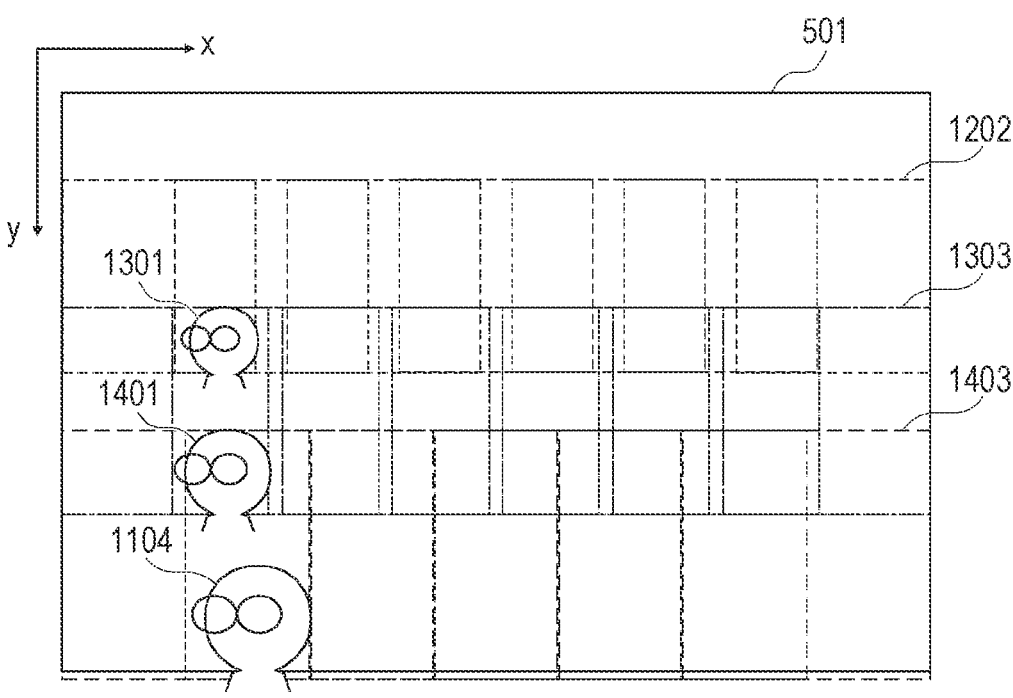
FIG. 25 is an explanatory diagram of adjustment of detection regions according to the third embodiment.

FIG. 25 is a diagram illustrating a result of S436 performed on the detection regions in the individual rows. For reference, FIG. 25 also illustrates the faces 1301, 1401, and 1104 used to determine the overlapping ranges in the x-axis direction in the individual rows. The subsequent processing is similar to that in the first embodiment, and thus the description thereof is omitted.

As described above, in the third embodiment, the sizes of detection regions are limited by the size of the minimum face, and the overlapping range of the detection regions is limited by the size of the maximum face. Accordingly, in the information processing apparatus 100 according to the third embodiment, even if the face size varies at each position, the sizes of detection regions and the overlapping ranges between adjacent detection regions can be determined based on the distribution of face sizes. As a result, in the information processing apparatus 100 according to the third embodiment, it is possible to finally output an appropriate detection result in object detection in the plurality of detection regions and the processing of integrating detection results.

In the third embodiment, the face size depends only on the y coordinate. Thus, the image size and the y coordinate in each row are determined, and then an overlapping range width in the x-axis direction and the number of detection regions are determined. Also in the third embodiment, detection regions can be set even when face sizes depend only on the x coordinate, similarly to the above. That is, when the face sizes in the detection target range 1105 depend on the x coordinate, for example, detection regions may be allocated in order from a position where the size of a minimum face is smallest in an undetected region.

Also in the third embodiment, the processing of reducing a detection region described in modification 1 of the first embodiment and the processing of adding a detection region described in modification 2 are applicable. Note that, in modification 2 of the first embodiment, the width of an overlapping range is set to be smaller than the unity magnification of the face size, or the size of a detection region is increased relative to the minimum size of the face. In contrast, in the third embodiment, the width of an overlapping range between detection regions and the sizes of detection regions may be changed in accordance with the difference between the maximum size and the minimum size of the detection target. That is, when the difference between the size of the maximum face and the size of the minimum face is large, it is effective to relax the condition of an overlapping range or the condition of a detection region size. Thus, the difference between the size of the maximum face and the size of the minimum face may a condition for relaxing these conditions. In particular, a face having a large size can be accurately detected even if the face is not within a detection region. Thus, when the difference between the size of the maximum face and the size of the minimum face is larger than or equal to a predetermined value, it is also effective to make the width of the overlapping range smaller than the unity magnification of the size of the maximum face.

Furthermore, also in the third embodiment, similarly to the example in the second embodiment described above, it is possible to set detection regions when the face size depends on not only the y coordinate but also the x coordinate. That is, in the third embodiment, similarly to the above, detection regions can be set such that a face at any position in the detection target range has a detection region including the face, and that the detection regions cover the entire detection target range.

Fourth Embodiment

Next, the information processing apparatus 100 according to a fourth embodiment will be described. The configuration of the information processing apparatus 100 according to the fourth embodiment is similar to that illustrated in FIG. 1 and FIG. 2 described above, and thus the description thereof will be omitted. Also in the fourth embodiment, a description will be given of an example in which the face size depends only on the y coordinate, and there is no substantial decrease in detection accuracy when the horizontal width of the face size is larger than or equal to ¼ of the size of a detection region, as in the foregoing first embodiment.

In the above third embodiment, a description has been given of an example of setting detection regions to cover the detection target range by using the minimum face and the maximum face in the distribution because the face size may greatly vary with respect to the same y coordinate when the depression angle of the image capturing apparatus is shallow, as illustrated in FIG. 19. The number n of detection regions in the first row can be expressed by equation (2) as described above, where d is the size of a detection region, sl is the horizontal width of the maximum face (maximum size), and w is the horizontal width of the captured image. The size d of a detection region is four times the size of the minimum face. Thus, d=4×ss holds when the horizontal width of the minimum face (minimum size ss) is used. Accordingly, the number n of detection regions can be expressed by the following equation (3).

$$n=\text{ceil}((w/sl-1)/(4\times ss/sl-1)) \tag{3}$$

Here, for example, when the distribution of face sizes is wide and the size of the maximum face is large relative to the size of the minimum face, the value of ss/sl in equation (3) is small, and thus the denominator is small. As a result, the value of the number n of detection regions in the first row is large. Furthermore, for example, when sl≥4×ss holds, the width of the overlapping range is larger than or equal to the size of the detection region, and it is not possible to set detection regions by the region setting processing described in the third embodiment.

Thus, the region setting unit 204 according to the fourth embodiment divides the distribution of face sizes when the difference between the maximum size and the minimum size of the detection target (face) assumed at each position is larger than or equal to a predetermined value. Furthermore, the region setting unit 204 determines the sizes of detection regions and overlapping ranges between adjacent detection regions, based on the minimum size and the maximum size assumed at each position in the plurality of distributions obtained through the division. The region setting unit 204 sets, as detection regions, a combination of detection regions set for the plurality of distributions.

In the fourth embodiment, the region setting unit 204 sets, based on the distribution of face sizes acquired by the size acquisition unit 203, a distribution of an intermediate size sm in which ss<sm<sl, sm<4×ss, and sl<4×sm hold at any position depending on the y coordinate. Furthermore, the region setting unit 204 sets two distributions (i.e., divides a distribution), that is, a distribution from the minimum size ss to the intermediate size sm and a distribution from the intermediate size sm to the maximum size sl, instead of the minimum size and the maximum size of the face described in the third embodiment. Subsequently, the region setting unit 204 performs region setting processing described in the third embodiment on each of the two distributions, that is, the distribution from the minimum size ss to the intermediate size sm and the distribution from the intermediate size sm to the maximum size sl, and obtains detection region groups covering the detection target range. After that, the region setting unit 204 sets detection regions by combining the two detection region groups acquired for the two distributions.

Accordingly, in the fourth embodiment, the number of detection regions and the sizes of detection regions can be appropriately set even when the size of the maximum face is large relative to the size of the minimum face in the distribution of face sizes.

In the above-described example, the distribution of face sizes is divided into two distributions, that is, a distribution from the minimum size to the intermediate size and a distribution from the intermediate size to the maximum size. Alternatively, for example, the distribution may be divided into three or more distributions when the condition sm<4×ss and sl<4×sm is not satisfied. The division number and the division ratio at the time of dividing a distribution may be determined in advance, or may be optimized in accordance with an acquired distribution. The detection target range may be set for a plurality of distributions obtained through division. For example, in a range where the y coordinate is small, the difference between the maximum face and the minimum face is small. Thus, the total number of detection regions may be reduced by setting detection regions only in one detection region group.

In the fourth embodiment, after the distribution of face sizes has been divided into a plurality of distributions, region setting processing similar to that described in the third embodiment is performed. Thus, the modifications of the first embodiment are applicable to the fourth embodiment. The fourth embodiment is also applicable to a case where the face size depends on not only the y coordinate but also the x coordinate, as in the second embodiment.

In the fourth embodiment, as described above, the distribution of face sizes is divided into, for example, two distributions, and a detection region group is set for each of the two distributions. Thus, the detection unit 202 obtains a detection result for each detection region group. Thus, the integration unit 205 according to the fourth embodiment performs not only the integration processing described in the first embodiment but also processing of integrating detection results for the detection region groups. The integration processing in the detection region at the same position described in the first embodiment and the integration processing between adjacent detection regions in a detection region group at the same position are similar to those described above, and thus the description thereof will be omitted.

Hereinafter, a description will be given of processing of integrating detection results for two detection region groups in the fourth embodiment. The integration processing similar to that in the first embodiment may be used as the processing of integrating detection results for two detection region groups. However, in the fourth embodiment, integration processing based on the ratio between the size of a detection result and the size of a detection region between the two detection region groups is performed.

Figure 26:
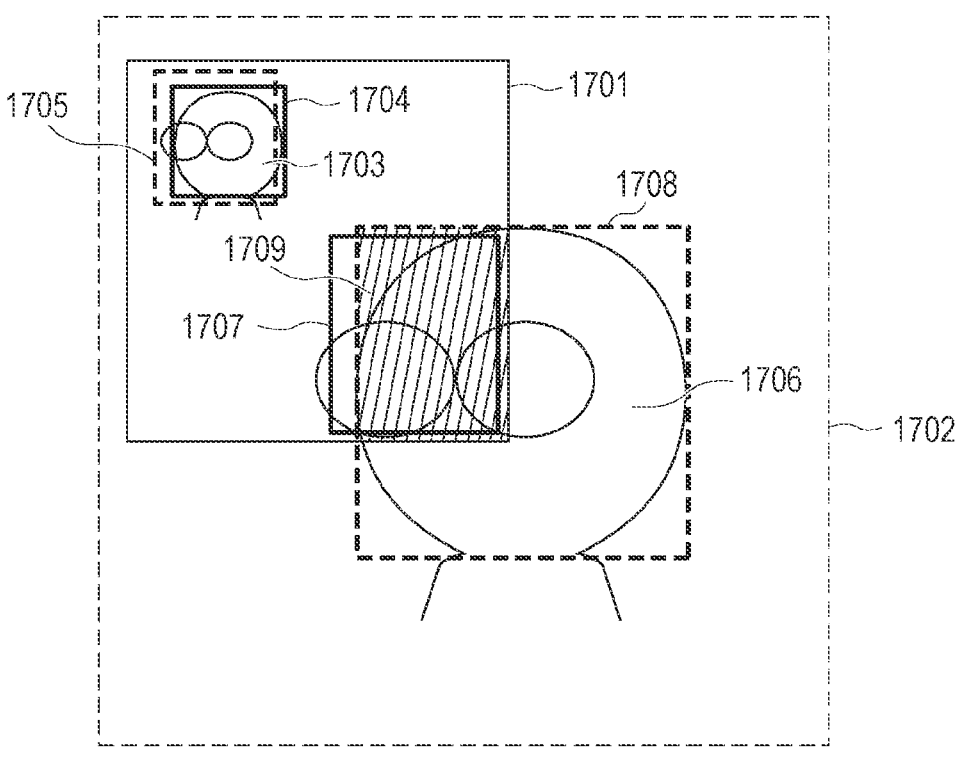
FIG. 26 is an explanatory diagram of processing of integrating detection results according to a fourth embodiment.

FIG. 26 is a diagram for describing integration processing based on the ratio between the size of a detection result and the size of a detection region between the two detection region groups.

In the fourth embodiment, as described above, a distribution of face sizes is divided into two distributions, and two detection region groups for the two distributions are set. That is, one of the detection region groups corresponds to a distribution from the minimum size to the intermediate size, and the other detection region group corresponds to a distribution from the intermediate size to the maximum size. Thus, in the detection target range, a small detection region 1701 belonging to the one detection region group and a large detection region 1702 belonging to the other detection region group are arranged so as to overlap each other.

Thus, for example, in the case of a small face 1703, the detection frames detected by the detection unit 202 are a detection frame 1704 in the detection region 1701 and a detection frame 1705 in the detection region 1702, and these detection frames are output to the integration unit 205. Here, it is assumed that the size of the detection frame 1705 is smaller than the minimum size of a face that can be accurately detected with respect to the size of the detection region 1702 (smaller than ¼ of the size of the detection region 1702). On the other hand, it is assumed that the size of the detection frame 1704 is larger than or equal to the minimum size of a face that can be accurately detected with respect to the size of the detection region 1701 (larger than or equal to ¼ of the size of the detection region 1701). In this case, because the size of the detection frame 1705 is smaller than the minimum size of a face that can be accurately detected with respect to the size of the detection region 1702, the integration unit 205 excludes the detection frame 1705 from integration. On the other hand, because the size of the detection frame 1704 is larger than or equal to the minimum size of a face that can be accurately detected with respect to the size of the detection region 1701, the integration unit 205 adopts the detection frame 1704.

For example, in the case of a large face 1706, the detection frames detected by the detection unit 202 are a detection frame 1707 in the detection region 1701 and a detection frame 1708 in the detection region 1702, and these detection frames are output to the integration unit 205. It is assumed that the size of the detection frame 1708 is larger than or equal to the minimum size of a face that can be accurately detected with respect to the size of the detection region 1702, and the detection frame 1708 is located near the center of the detection region 1702. On the other hand, it is assume that the size of the detection frame 1707 is larger than or equal to the minimum size of a face that can be accurately detected with respect to the size of the detection region 1701, but IoU has a large value in a common portion 1709 indicated by a hatched portion between the detection frame 1708 and the detection region 1701. In this case, because IoU of the common portion 1709 between the detection frame 1708 and the detection region 1701 has a large value, the integration unit 205 determines that the detection frame 1707 is a part of the face detected in the detection frame 1708, and excludes the detection frame 1707. In this case, the integration unit 205 may use reliability as a determination criterion for exclusion, for example, may determine to exclude the detection frame 1707 only when the reliability of the detection frame 1707 is lower than that of the detection frame 1708. In this example, the integration unit 205 adopts the detection frame 1708.

The order of integration processing in the fourth embodiment may be an order in which integration processing within the detection region at the same position is performed, integration processing between adjacent detection regions within the detection region group at the same position is performed, and then integration processing between detection region groups is performed, but is not limited to this order.

When the difference between the maximum size and the minimum size of a detection target at each position is large in a distribution, the information processing apparatus 100 according to the fourth embodiment determines the sizes of detection regions and overlapping ranges between adjacent detection regions, based on a plurality of distributions obtained by dividing the distribution. Accordingly, the information processing apparatus 100 according to the fourth embodiment is capable of covering the entire detection target range with a smaller number of detection regions. Furthermore, in the fourth embodiment, integration processing of adopting or excluding a detection frame of a detection result between detection region groups is performed in accordance with whether the detection frame is smaller than or is equal to or larger than the ratio of the minimum size that can be accurately detected with respect to the detection region size between the detection region groups. In the fourth embodiment, integration processing of adopting or excluding a detection frame is performed based on an IoU value of a common portion of detection frames of detection results between detection region groups or reliability. Accordingly, in the fourth embodiment, it is possible to finally output an appropriate detection result in the object detection in the plurality of detection regions and the processing of integrating detection results.

The present invention is implementable by processing in which a program for implementing one or more functions of the above-described embodiments is supplied to a system or an apparatus via a network or a storage medium, and one or more processors in a computer of the system or the apparatus read and execute the program. The present invention is also implementable by a circuit (for example, an application specific integrated circuit (ASIC)) that implements one or more functions.

Each of the above-described embodiments is merely a specific example for carrying out the present invention, and the technical scope of the present invention should not be interpreted in a limited manner by these embodiments. That is, the present invention is implementable in various forms without departing from the technical idea or the main features thereof.

The disclosure of the above-described embodiments includes the following configurations, methods, and program.

Configuration 1

An information processing apparatus including:

an image acquisition unit configured to acquire an image;

a size acquisition unit configured to acquire detection target sizes at individual positions in the image;

a region setting unit configured to set a plurality of detection regions for the image; and a detection unit configured to detect, from the image acquired by the image acquisition unit, a detection target in each of the detection regions, wherein the region setting unit is configured to set, based on the detection target sizes at the individual positions acquired by the size acquisition unit, sizes of the detection regions at the individual positions in the image and overlapping ranges between adjacent detection regions.

Configuration 2

The information processing apparatus according to Configuration 1, further including a range setting unit configured to set, for the image acquired by the image acquisition unit, a target range in which all the plurality of detection regions set by the region setting unit are arranged.

Configuration 3

The information processing apparatus according to Configuration 2, wherein the range setting unit is configured to set the target range, based on the detection target sizes at the individual positions acquired by the size acquisition unit.

Configuration 4

The information processing apparatus according to any one of Configurations 1 to 3, wherein the region setting unit is configured to set the overlapping ranges between the adjacent detection regions, each of the overlapping ranges having a width having a predetermined ratio with respect to the detection target size at a corresponding one of the individual positions.

Configuration 5

The information processing apparatus according to Configuration 4, wherein the region setting unit is configured to set the overlapping ranges, each of the overlapping ranges having a width capable of including the detection target having the detection target size at a corresponding one of the individual positions.

Configuration 6

The information processing apparatus according to any one of Configurations 1 to 5, wherein the size acquisition unit is configured to acquire, for each of the individual positions, a minimum size and a maximum size that are possible as the detection target size, and the region setting unit is configured to set, based on the minimum sizes and the maximum sizes of the detection target sizes at the individual positions, the sizes of the detection regions and the overlapping ranges between the adjacent detection regions.

Configuration 7

The information processing apparatus according to Configuration 6, wherein the region setting unit is configured to in a case where a difference between the minimum size and the maximum size of the detection target size is larger than or equal to a predetermined value, divide a distribution of the detection target sizes at the individual positions into a plurality of distributions, and based on the minimum sizes and the maximum sizes of the detection target sizes at the individual positions in the plurality of distributions, determine the sizes of the detection regions and the overlapping ranges between the adjacent detection regions, and then set, as the plurality of detection regions, a combination of detection regions determined for each of the plurality of distributions.

Configuration 8

The information processing apparatus according to Configuration 6 or 7, wherein the region setting unit is configured to change the sizes of the detection regions and the overlapping ranges between the adjacent detection regions, based on a difference between the minimum size and the maximum size.

Configuration 9

The information processing apparatus according to any one of Configurations 1 to 8, wherein a total number of the plurality of detection regions set by the region setting unit is a minimum number satisfying a predetermined condition for setting the overlapping ranges and a predetermined condition for setting the sizes of the detection regions.

Configuration 10

The information processing apparatus according to any one of Configurations 1 to 9, wherein the region setting unit is configured to reduce the sizes of the detection regions within a range satisfying a predetermined condition for setting the overlapping ranges and a predetermined condition for setting the sizes of the detection regions.

Configuration 11

The information processing apparatus according to any one of Configurations 1 to 10, further including an upper limit setting unit configured to set an upper limit of the number of the detection regions set by the region setting unit.

Configuration 12

The information processing apparatus according to Configuration 11, wherein the region setting unit is configured to adjust the number of the detection regions within a range satisfying a predetermined condition for setting the overlapping ranges, a predetermined condition for setting the sizes of the detection regions, and the upper limit of the number of the detection regions set by the upper limit setting unit.

Configuration 13

The information processing apparatus according to Configuration 12, wherein the region setting unit is configured to increase the number of the detection regions and reduce the sizes of the detection regions.

Configuration 14

The information processing apparatus according to Configuration 12, wherein the region setting unit is configured to output a predetermined warning in a case where the number of the detection regions when the predetermined condition for setting the overlapping ranges and the predetermined condition for setting the sizes of the detection regions are satisfied exceeds the upper limit.

Configuration 15

The information processing apparatus according to Configuration 12 or 13, wherein the region setting unit is configured to relax the predetermined condition for setting the overlapping ranges or the predetermined condition for setting the sizes of the detection regions in a case where the number of the detection regions exceeds the upper limit while the predetermined condition for setting the overlapping ranges and the predetermined condition for setting the sizes of the detection regions are satisfied.

Configuration 16

The information processing apparatus according to any one of Configurations 1 to 15, further including an integration unit configured to integrate detection results for the detection targets generated by the detection unit in accordance with arrangement of the detection regions set by the region setting unit.

Configuration 17

The information processing apparatus according to any one of Configurations 1 to 16, wherein the size acquisition unit is configured to acquire the detection target sizes at the individual positions in an axis direction of the image, the axis direction being either an x-axis direction or a y-axis direction, and the region setting unit is configured to set, based on the detection target sizes at the individual positions in the axis direction acquired by the size acquisition unit, the sizes of the detection regions at the individual positions and the overlapping ranges between the adjacent detection regions.

Configuration 18

The information processing apparatus according to any one of Configurations 1 to 16, wherein the size acquisition unit is configured to acquire the detection target sizes at the individual positions in both an x-axis direction and a y-axis direction of the image, and the region setting unit is configured to set, based on the detection target sizes at the individual positions in the x-axis direction and the y-axis direction acquired by the size acquisition unit, the sizes of the detection regions at the individual positions and the overlapping ranges between the adjacent detection regions.

Configuration 19

The information processing apparatus according to Configuration 18, wherein the region setting unit is configured to, when setting a detection region at a next position in the x-axis direction and the y-axis direction with respect to a set detection region, set, as a setting-completed region, a region obtained by excluding an overlapping range from the set detection region, and set, based on a detection target size at the next position in the x-axis direction and the y-axis direction, a size of the detection region at the next position and an overlapping range between adjacent detection regions with respect to an unset region other than the setting-completed region.

Configuration 20

The information processing apparatus according to any one of Configurations 1 to 19, wherein the detection unit is configured to detect the detection target in each of the detection regions by using a learning model obtained through machine learning, and the region setting unit is configured to set, based on an input size for the learning model and the detection target sizes at the individual positions, the sizes of the detection regions at the individual positions and the overlapping ranges between the adjacent detection regions.

Configuration 21

An information processing apparatus including:

an image acquisition unit configured to acquire an image;

a region setting unit configured to set a plurality of detection regions for the image; and a detection unit configured to detect, from the image acquired by the image acquisition unit, a detection target in each of the detection regions, wherein the region setting unit is configured to set the detection regions such that adjacent detection regions overlap each other without omission.

Method 1

An information processing method including:

an image acquisition step of acquiring an image;

a size acquisition step of acquiring detection target sizes at individual positions in the image;

a region setting step of setting a plurality of detection regions for the image; and a detection step of detecting, from the image acquired by the image acquisition step, a detection target in each of the detection regions, wherein the region setting step sets, based on the detection target sizes at the individual positions acquired by the size acquisition step, sizes of the detection regions at the individual positions in the image and overlapping ranges between adjacent detection regions.

Method 2

An information processing method including:

an image acquisition step of acquiring an image;

a region setting step of setting a plurality of detection regions for the image; and a detection step of detecting, from the image acquired by the image acquisition step, a detection target in each of the detection regions, wherein the region setting step sets the detection regions such that adjacent detection regions overlap each other without omission.

Program 1

A program for causing a computer to function as the information processing apparatus according to any one of Configurations 1 to 21.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-100387, filed Jun. 22, 2022, which is hereby incorporated by reference herein in its entirety.

What is claimed is:

1. An information processing apparatus comprising:
at least one processor; and
at least one memory having stored thereon instructions which, when executed by the at least one processor, cause the information processing apparatus to:
acquire an image;
acquire detection target sizes at individual positions in at least one axis direction of the image, the axis direction being an x-axis direction or a y-axis direction;
set a plurality of detection regions for the image; and
detect, from the image, a detection target in each of the detection regions,
wherein the instructions further cause the information processing apparatus to set, based on the detection target sizes at the individual positions in the axis direction, sizes of the detection regions at the individual positions in the image and overlapping ranges between adjacent detection regions.

2. The information processing apparatus according to claim 1,
wherein the instructions further cause the information processing apparatus to set, for the image acquired, a target range in which all the plurality of detection regions are arranged.

3. The information processing apparatus according to claim 2, wherein the instructions further cause the information processing apparatus to set the target range, based on the detection target sizes at the individual positions.

4. The information processing apparatus according to claim 1, wherein the instructions further cause the information processing apparatus to set the overlapping ranges, each of the overlapping ranges having a width capable of including the detection target having the detection target size at a corresponding one of the individual positions.

5. The information processing apparatus according to claim 1, wherein
the instructions further cause the information processing apparatus to acquire, for each of the individual positions, a minimum size and a maximum size that are possible as the detection target size, and
set, based on the minimum sizes and the maximum sizes of the detection target sizes at the individual positions, the sizes of the detection regions and the overlapping ranges between the adjacent detection regions.

6. The information processing apparatus according to claim 5, wherein the instructions further cause the information processing apparatus to
in a case where a difference between the minimum size and the maximum size of the detection target size is larger than or equal to a predetermined value, divide a distribution of the detection target sizes at the individual positions into a plurality of distributions, and
based on the minimum sizes and the maximum sizes of the detection target sizes at the individual positions in the plurality of distributions, determine the sizes of the detection regions and the overlapping ranges between the adjacent detection regions, and then set, as the plurality of detection regions, a combination of detection regions determined for each of the plurality of distributions.

7. The information processing apparatus according to claim 5, wherein the instructions further cause the information processing apparatus to change the sizes of the detection regions and the overlapping ranges between the adjacent detection regions, based on a difference between the minimum size and the maximum size.

8. The information processing apparatus according to claim 1, wherein the instructions further cause the information processing apparatus to set a total number of the plurality of detection regions is a minimum number satisfying a predetermined condition for setting the overlapping ranges and a predetermined condition for setting the sizes of the detection regions.

9. The information processing apparatus according to claim 1, wherein the instructions further cause the information processing apparatus to reduce the sizes of the detection regions within a range satisfying a predetermined condition for setting the overlapping ranges and a predetermined condition for setting the sizes of the detection regions.

10. The information processing apparatus according to claim 1,
wherein the instructions further cause the information processing apparatus to set an upper limit of the number of the detection regions,
adjust the number of the detection regions within a range satisfying a predetermined condition for setting the overlapping ranges, a predetermined condition for setting the sizes of the detection regions, and the upper limit of the number of the detection regions.

11. The information processing apparatus according to claim 10, wherein the instructions further cause the information processing apparatus to increase the number of the detection regions and reduce the sizes of the detection regions.

12. The information processing apparatus according to claim 10, wherein the instructions further cause the information processing apparatus to output a predetermined warning in a case where the number of the detection regions when the predetermined condition for setting the overlapping ranges and the predetermined condition for setting the sizes of the detection regions are satisfied exceeds the upper limit.

13. The information processing apparatus according to claim 1, wherein the instructions further cause the information processing apparatus to set an upper limit of the number of the detection regions, and to relax a predetermined condition for setting the overlapping ranges or a predetermined condition for setting the sizes of the detection regions in a case where the number of the detection regions exceeds the upper limit while the predetermined condition for setting the overlapping ranges and the predetermined condition for setting the sizes of the detection regions are satisfied.

14. The information processing apparatus according to claim 1, wherein the instructions further cause the information processing apparatus to integrate detection results for the detection targets generated by the detection performed in each of the detection regions in accordance with arrangement of the detection regions.

15. The information processing apparatus according to claim 1, wherein the instructions further cause the information processing apparatus to acquire the detection target sizes at the individual positions in both the x-axis direction and the y-axis direction of the image, and set, based on the detection target sizes at the individual positions in the x-axis direction and the y-axis direction, the sizes of the detection regions at the individual positions and the overlapping ranges between the adjacent detection regions.

16. The information processing apparatus according to claim 1, wherein the instructions further cause the information processing apparatus to detect the detection target in each of the detection regions by using a learning model obtained through machine learning, and set, based on an input size for the learning model and the detection target sizes at the individual positions, the sizes of the detection regions at the individual positions and the overlapping ranges between the adjacent detection regions.

17. The information processing apparatus according to claim 1, wherein the instructions further cause the information processing apparatus to set the detection regions such that the adjacent detection regions overlap each other without omission.

18. An information processing method comprising:

an image acquisition step of acquiring an image;

a size acquisition step of acquiring detection target sizes at individual positions in at least one axis direction of the image, the axis direction being an x-axis direction or a y-axis direction;

a region setting step of setting a plurality of detection regions for the image; and a detection step of detecting, from the image acquired by the image acquisition step, a detection target in each of the detection regions, wherein the region setting step sets, based on the detection target sizes at the individual positions acquired by the size acquisition step in the axis direction, sizes of the detection regions at the individual positions in the image and overlapping ranges between adjacent detection regions.

19. A non-transitory computer-readable storage medium storing a program for causing a computer to execute an information processing method comprising:

an image acquisition step of acquiring an image;

a size acquisition step of acquiring detection target sizes at individual positions in at least one axis direction of the image, the axis direction being an x-axis direction or a y-axis direction;

a region setting step of setting a plurality of detection regions for the image; and a detection step of detecting, from the image acquired by the image acquisition step, a detection target in each of the detection regions, wherein the region setting step sets, based on the detection target sizes at the individual positions acquired by the size acquisition step in the axis direction, sizes of the detection regions at the individual positions in the image and overlapping ranges between adjacent detection regions.

* * * * *